(12) United States Patent
Noh et al.

(10) Patent No.: US 12,199,905 B2
(45) Date of Patent: Jan. 14, 2025

(54) METHOD AND APPARATUS FOR CONFIGURING TRIGGER FRAME FOR A-PPDU IN A WIRELESS COMMUNICATION SYSTEM

(71) Applicant: Senscomm Semiconductor Co., Ltd., Suzhou (CN)

(72) Inventors: Yujin Noh, Irvine, CA (US); Seung Hyeok Ahn, Irvine, CA (US); Seung Ho Choo, Suzhou (CN); Young-Hwan Kang, Pyeongtaek-si (KR); Jungchul Shin, Seoul (KR); Tan Joong Park, Seoul (KR); Daehong Kim, Irvine, CA (US)

(73) Assignee: Senscomm Semiconductor Co., Ltd., Suzhou (CN)

( * ) Notice: Subject to any disclaimer, the term of this patent is extended or adjusted under 35 U.S.C. 154(b) by 329 days.

(21) Appl. No.: 17/739,837

(22) Filed: May 9, 2022

(65) Prior Publication Data

US 2022/0360397 A1    Nov. 10, 2022

Related U.S. Application Data

(60) Provisional application No. 63/288,412, filed on Dec. 10, 2021, provisional application No. 63/194,841, (Continued)

(51) Int. Cl.
*H04L 5/00* (2006.01)
*H04W 72/0446* (2023.01)
*H04W 72/566* (2023.01)

(52) U.S. Cl.
CPC ....... *H04L 5/0048* (2013.01); *H04W 72/0446* (2013.01); *H04W 72/566* (2023.01)

(58) Field of Classification Search
None
See application file for complete search history.

(56) References Cited

U.S. PATENT DOCUMENTS

2021/0409165 A1*  12/2021  Wang .............. H04L 1/1822
2022/0158773 A1*   5/2022  Kim ............... H04L 1/1848

OTHER PUBLICATIONS

Office Action for KR 10-2022-0057401 by Korean Intellectual Property Office dated Mar. 18, 2024.
(Continued)

*Primary Examiner* — Chi H Pham
*Assistant Examiner* — Raul Rivas
(74) *Attorney, Agent, or Firm* — BROADVIEW IP LAW, PC

(57) ABSTRACT

A method performed by a transmitter in a wireless local area network (WLAN) includes: determining to operate in A(aggregated)-PPDU transmission, wherein the A-PPDU transmission includes transmission of multiple sub-PPDUs with different variants; and transmitting, to a receiver, a trigger frame including a first field and a second field, wherein the first field indicates whether a first special user information field including first additional common information for a first variant is present; and wherein the second field indicates whether a second special user information field including second additional common information for a second variant is present, and wherein the first special user information field is located before the second special user information field in the trigger frame.

16 Claims, 20 Drawing Sheets

Related U.S. Application Data filed on May 28, 2021, provisional application No. 63/186,368, filed on May 10, 2021.

(56) References Cited

OTHER PUBLICATIONS

Ko, Geonjung et al. "TB PPDU Format Signaling in Trigger Frame", IEEE 802.11-20/1192r0. Aug. 2020.
Gan, Ming et al. "Backward compatible EHT trigger frame", IEEE 802.11-20/0840-00-00be. Jun. 2020.
Shellhammer, Steve et al. "Proposed Draft Specification for Trigger frame for EHT", IEEE P802.11 Wireless LANs. Mar. 2021.

* cited by examiner (a)

(b)

Added puncturing pattern
on top of static puncturing pattern

FIG. 10B

| B0 B3 | B4 B15 | B16 | B17 | B18 B19 | B20 B21 | B22 | B23 B25 |
|---|---|---|---|---|---|---|---|
| Trigger Type | UL Length | More TF | CS Required | UL BW | GI And HE/EHT-LTF Type/Triggered TXOP Sharing Mode | Reserved | Number Of HE/EHT-LTF Symbols |
| Bits: 4 | 12 | 1 | 1 | 2 | 2 | 1 | 3 |

| B26 | B27 | B28 B33 | B34 B35 | B36 | B37 B52 | B53 | B54 |
|---|---|---|---|---|---|---|---|
| LDPC Extra Symbol Segment | Reserved | AP TX Power | Pre-FEC Padding Factor | PE Disambiguity | UL Spatial Reuse | Reserved | HE/EHT P160 |
| Bits: 1 | 1 | 6 | 2 | 1 | 16 | 1 | 1 |

| B55 | B56 B62 | B63 | |
|---|---|---|---|
| Special User Info Field Flag | EHT Reserved | Reserved | Trigger Dependent Common Info |
| Bits: 1 | 7 | 1 | variable |

METHOD AND APPARATUS FOR CONFIGURING TRIGGER FRAME FOR A-PPDU IN A WIRELESS COMMUNICATION SYSTEM

CROSS REFERENCE TO PRIOR APPLICATIONS

The present application claims priority under 35 U.S.C. § 119 to U.S. Provisional Patent Application No. 63/186,368 (filed on May 10, 2021), U.S. Provisional Patent Application No. 63/194,841 (filed on May 28, 2021), and U.S. Provisional Patent Application No. 63/288,412 (filed on Dec. 10, 2021), which are all hereby incorporated by reference in their entirety.

BACKGROUND

The present disclosure relates to a method and apparatus for configuring Trigger frame for A-PPDU in a wireless communication system.

Wi-Fi is a Wireless Local Area Network (WLAN) technology that allows devices to access the Internet in the different frequency bands such as 2.4 GHz, 5 GHz, 6 GHz or 60 GHz frequency bands.

WLANs are based on the Institute of Electrical and Electronic Engineers (IEEE) 802.11 standard. The Wireless Next Generation Standing Committee (WNG SC) of IEEE 802.11 is an ad hoc committee that considers the next generation WLAN in the medium to long term.

The legacy IEEE 802.11a/b/g/n/ac does not guarantee communication stability in dense environments with many users. In order to overcome this limit, the IEEE 802.11ax as the WLAN system supporting High Efficiency (HE) has been developed. The IEEE 802.11ax aims to improve system throughput in dense environments.

Recently, there is a need for a new WLAN system to support maximum data throughput than the data throughput supported by IEEE 802.11ax.

IEEE 802.11be also known as Extremely High Throughput (EHT) WLAN is built upon 802.11ax, focusing on extremely high speed and extremely low latency for the wireless communication service such as 4k and 8k video streaming, virtual reality/augmented reality (VR/AR), etc.

The scope of IEEE 802.11be, often discussed in the next-generation WLAN task group, also known as IEEE 802.11be or Extremely High Throughput (EHT) WLAN, includes: 1) 320 MHz bandwidth and more efficient utilization of non-contiguous spectrum, 2) multiple RU (MRU) operation 3) Multi-band/multi-channel aggregation and operation (also referred to multiple link operation (MLO)), 4) 16 spatial streams and Multiple Input Multiple Output (MIMO) protocols enhancements, 5) Multi-Access Point (AP) Coordination (e.g. coordinated and joint transmission), 6) Enhanced link adaptation and retransmission protocol (e.g. Hybrid Automatic Repeat Request (HARD)), 7) if needed, adaptation to regulatory rules specific to 6 GHz spectrum, 8) Integrating Time-Sensitive Networking (TSN) extensions for low-latency real-time traffic (IEEE 802.11aa).

SUMMARY

In one embodiment, a method performed by a transmitter in a wireless local area network (WLAN) is provided. The method comprises: determining to operate in A(aggregated)-PPDU transmission, wherein the A-PPDU transmission includes transmission of multiple sub-PPDUs with different variants; and transmitting, to a receiver, a trigger frame including a first field and a second field, wherein the first field indicates whether a first special user information field including first additional common information for a first variant is present; and wherein the second field indicates whether a second special user information field including second additional common information for a second variant is present, and wherein the first special user information field is located before the second special user information field in the trigger frame.

In another embodiment, a transmitter in a wireless local area network (WLAN) is provided. The transmitter comprises: a transceiver; and a processor configured to: determine to operate in A(aggregated)-PPDU transmission, wherein the A-PPDU transmission includes transmission of multiple sub-PPDUs with different variants; and control the transceiver to transmit, to a receiver, a trigger frame including a first field and a second field, wherein the first field indicates whether a first special user information field including first additional common information for a first variant is present; and wherein the second field indicates whether a second special user information field including second additional common information for a second variant is present, and wherein the first special user information field is located before the second special user information field in the trigger frame.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10B illustrate an example of the Common Info field in the new Trigger frame according to an embodiment of the present disclosure.

DETAILED DESCRIPTION

Figure 1:
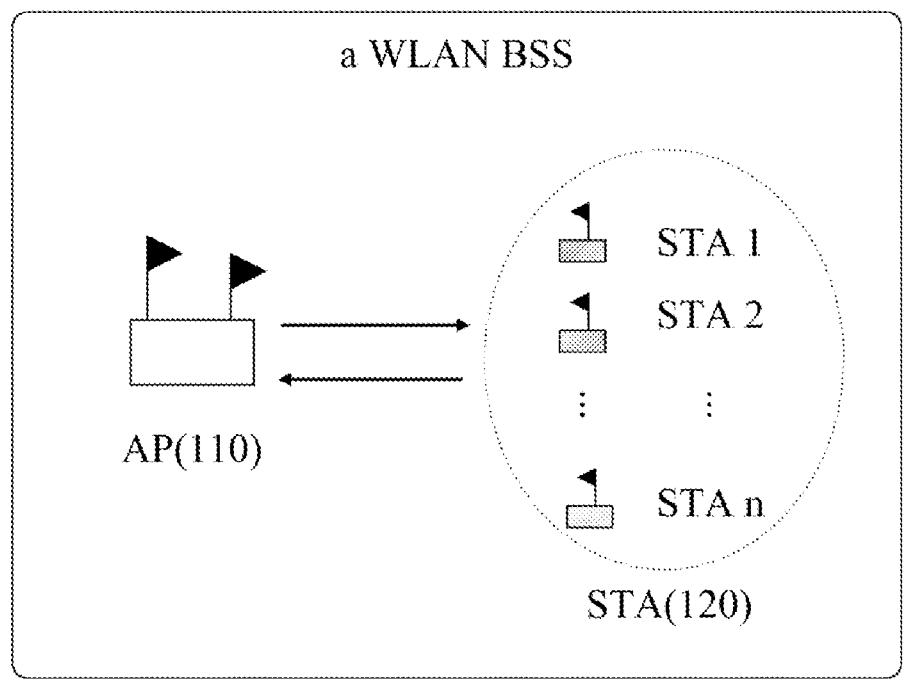
FIG. 1 illustrates an example BSS in a WLAN according to an embodiment of the present disclosure.

The following detailed description of the embodiments of the present disclosure is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the present disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The following detailed description of the embodiments of the present disclosure applies to a wireless local area network (WLAN). The following description may apply to the next generation WLAN method (IEEE 802.11be) or the like. The IEEE 802.11be maintains compatibility with the conventional IEEE 802.11a/b/g/n/ac/ax (Hereinafter referred to as "11a/b/g/n/ac/ax"). The following description may be executed in the IEEE 802.11be (Hereinafter referred to as "11be") environment, and also maintains compatibility with the conventional 11a/b/g/n/ac/ax.

In a WLAN, a single basic service set (BSS) is composed of two kinds of entity which are a single AP Station (STA) and a plurality of non-AP STAs. STAs share a same radio frequency channel with one out of WLAN operation bandwidth options (e.g., 20/40/80/160/320 MHz). Here, AP STA and non-AP STA could be referred as AP and STA, respectively.

WLAN has included operation of multiple users' frame transmissions and receptions simultaneously wherein frame exchanges are scheduled under the specific rule within a BSS. Here multi-user (MU) transmission means that the frames in a certain BSS are transmitted to (e.g., downlink (DL) MU) or from (e.g., uplink (UL) MU) a plurality of STAs simultaneously based on different resources. For example, different resources could be different frequency resources in orthogonal frequency division multiplexing access (OFDMA) transmission or different spatial streams in multi MU-multiple input multiple output (MIMO) transmission with DL-OFDMA, DL-MU-MIMO, UL-OFDMA, and UL-MU-MIMO of MU transmission as shown in FIG. 1 below.

FIG. 1 illustrates an example BSS in a WLAN according to an embodiment of the present disclosure.

Referring to FIG. 1, a WLAN BSS 100 may include a one AP 110 and a plurality of STAs 120. Any one of the plurality of STAs 120 may receive resource allocated for MU transmission and communicate with the AP 110. The AP 110 may deliver information regarding the resource allocation for MU transmission to any one of the plurality of STAs 120. The plurality of STAs 120 may receive/transmit, from/to the AP 110, the frames simultaneously in the WLAN BSS 100 based on the allocated resources for MU transmission.

Figure 2A:
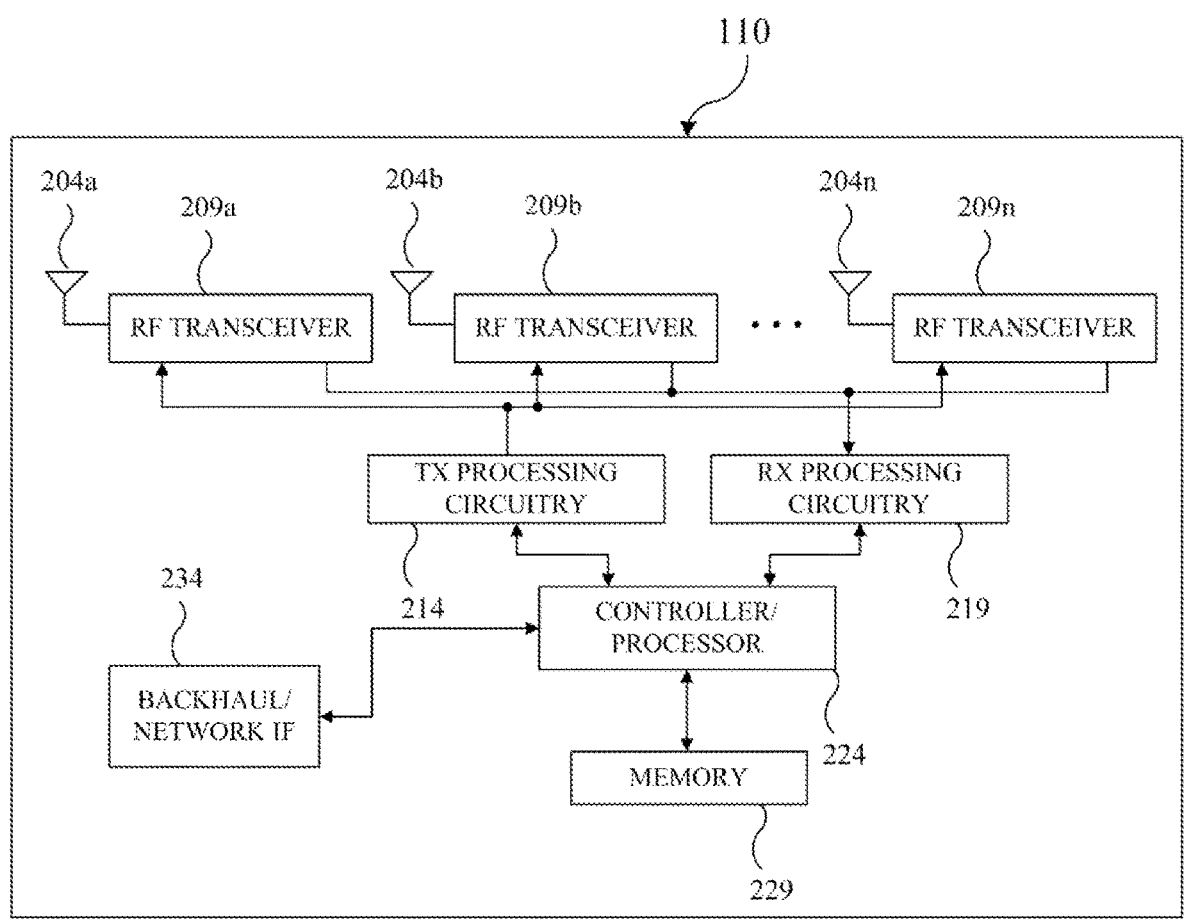
FIG. 2A illustrates an example AP 110 according to an embodiment of the present disclosure.

FIG. 2A illustrates an example AP 110 according to an embodiment of the present disclosure. The embodiment of the AP 110 illustrated in FIG. 2A is for illustration only, and the AP 110 of FIG. 1 could have the same or similar configuration. However, APs come in a wide variety of configurations, and FIG. 2A does not limit the scope of the present disclosure to any particular implementation of an AP.

As shown in FIG. 2A, the AP 110 includes multiple antennas 204a-204n, multiple RF transceivers 209a-209n, transmit (TX) processing circuitry 214, and receive (RX) processing circuitry 219. The AP 110 also includes a controller/processor 224, a memory 229, and a backhaul or network interface 234.

The RF transceivers 209a-209n receive, from the antennas 204a-204n, incoming RF signals, such as signals transmitted by STAs in the WLAN BSS 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 110. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs). Any of a wide variety of other functions could be supported in the AP 110 by the controller/processor 224 including a combination of DL MU-MIMO and OFDMA in the same transmit opportunity. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 110 to communicate with other devices or systems over a backhaul connection or over a network. The interface 234 could support communications over any suitable wired or wireless connection(s). For example, the interface 234 could allow the AP 110 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 110 may include circuitry and/or programming for management of channel sounding procedures in WLANs. Although FIG. 2A illustrates one example of AP 101, various changes may be made to FIG. 2A. For example, the AP 110 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 110 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
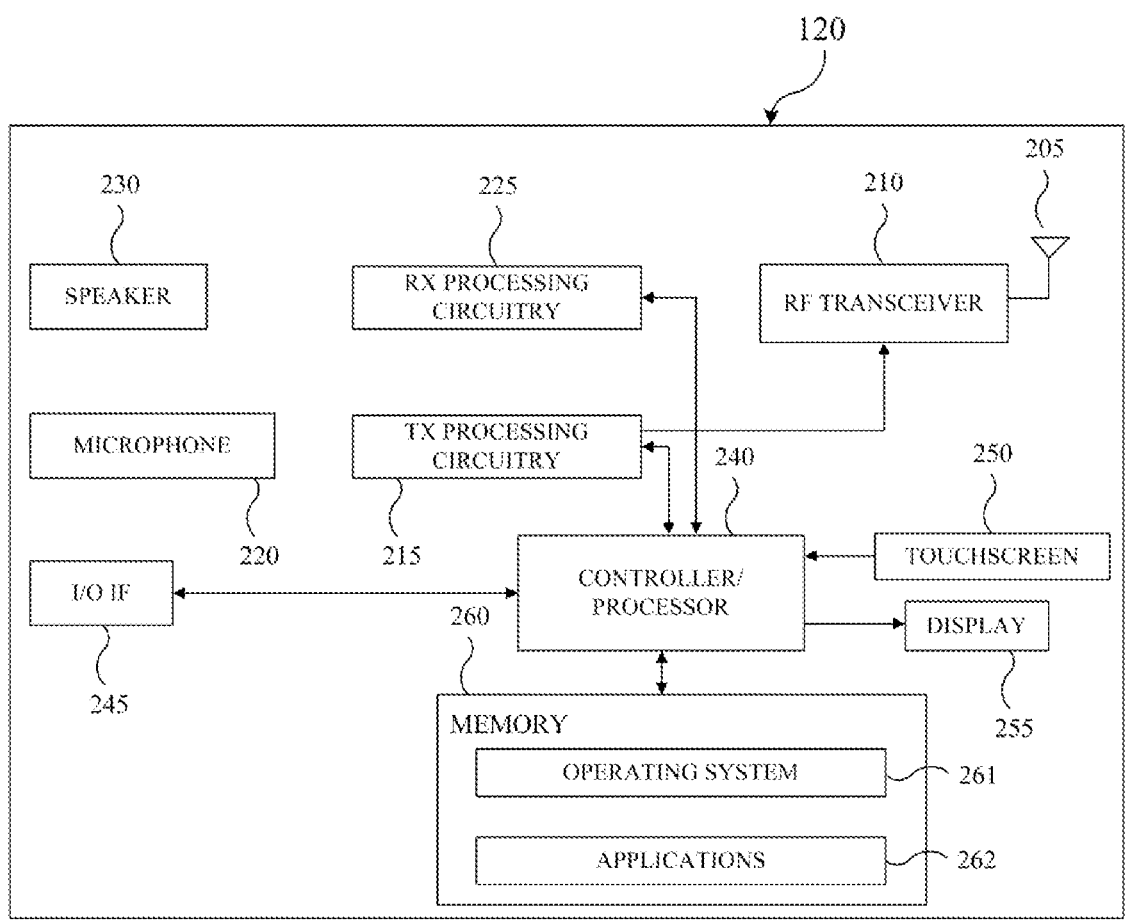
FIG. 2B illustrates an example STA 120 according to an embodiment of the present disclosure.

FIG. 2B illustrates an example STA 120 according to an embodiment of the present disclosure. The embodiment of the STA 120 illustrated in FIG. 2B is for illustration only, and the STAs 120 of FIG. 1 could have the same or similar configuration. However, STAs come in a wide variety of configurations, and FIG. 2B does not limit the scope of the present disclosure to any particular implementation of a STA.

As shown in FIG. 2B, the STA 120 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the WLAN BSS 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 120. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of channel sounding procedures in WLANs. In some embodiments, the controller/processor 240 includes at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet (NDP) Announcement frame and NDP frame and transmitting the beamforming feedback report in response to a Trigger frame. The controller/processor 240 can operate the plurality of applications 262 based on the OS program 261 or in response to a signal received from an AP. The main controller/processor 240 is also coupled to the I/O interface 245, which provides STA 120 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 120 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 120, various changes may be made to FIG. 2B. For example, various components in FIG. 2B could be combined, further subdivided, or omitted and additional components could be added according to particular needs. In particular examples, the STA 120 may include any number of antenna(s) 205 for MIMO communication with an AP 110. In another example, the STA 120 may not include voice communication or the controller/processor 240 could be divided into multiple processors, such as one or more central processing units (CPUs) and one or more graphics processing units (GPUs). Also, while FIG. 2B illustrates the STA 120 configured as a mobile telephone or smartphone, STAs could be configured to operate as other types of mobile or stationary devices.

Multi-user access modulation, for example, OFDMA for uplink and downlink has been introduced since High Efficiency (HE) WLAN, 11ax and after such future amendments such as extreme high throughput (EHT), and one or more STAs are allowed to use one or more resource units (RUs) throughout operation bandwidth and transmit at the same time. One RU is the minimum granularity which can be assigned and has decades of subcarriers in OFDM modulation symbol. Here, STAs could be associated or non-associated with AP when responding simultaneously in the assigned RUs within a specific period (e.g., SIFS, short inter frame space) as shown in FIG. 3 below.

Figure 3:
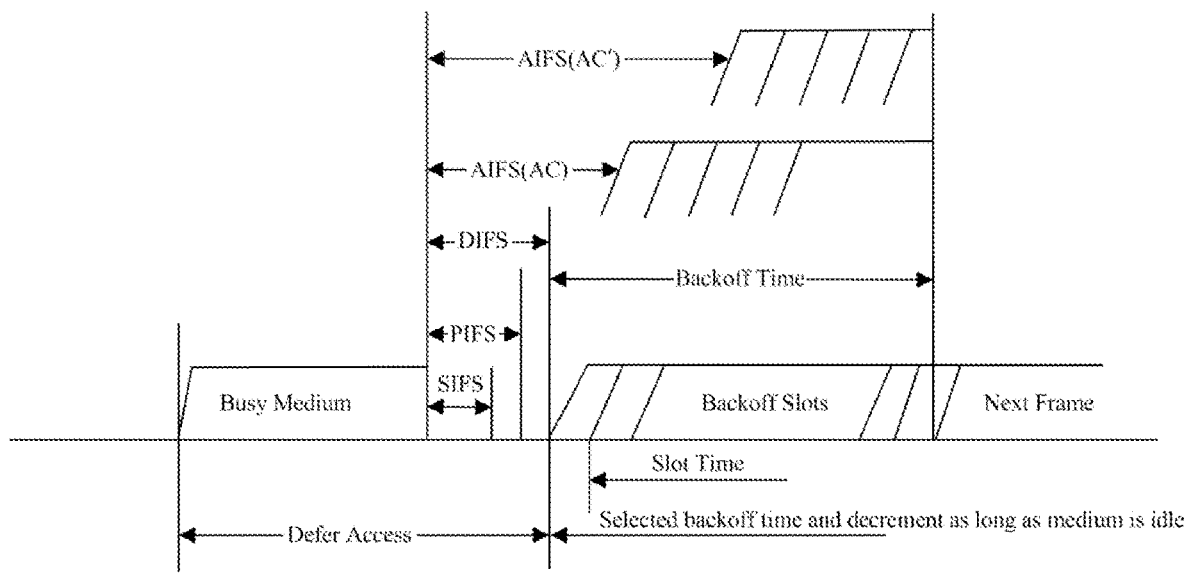
FIG. 3 illustrates different types of IFS in a WLAN according to an embodiment of the present disclosure.

FIG. 3 illustrates different types of IFS in a WLAN according to an embodiment of the present disclosure.

Referring to FIG. 3, inter frame space (IFS) is waiting periods between transmission of frames operating in the medium access control (MAC) sublayer where carrier-sense multi access/collision avoidance (CSMA/CA) is used. For example, IFS is the time period between completion of the transmission of the last frame and starting transmission of the next frame apart from the variable back-off period. The IEEE 802.11 standard defines various types of IFS such as short IFS (SIFS), point coordination function (PCF) IFS (PIFS), distributed coordination function (DCF) IFS (DIFS), and arbitration IFS (AIFS) to provide priority levels for access to wireless media. The relationship between the different IFS is illustrated in FIG. 3. SIFS is used for an acknowledgement (ACK) and for a ready to send (RTS) frame and clear to send (CTS) frame based high priority transmission. For example, if the control frame is a response frame of a previous frame, the WLAN device transmits the control frame without performing backoff if a SIFS has elapsed. PIFS is used in contention-free period (CFP) in PCF mode. For example, after the PIFS has elapsed, STAs having data to be transmitted in contention free period cand be initiated. DIFS is used for contention-based services/applications. For example, using DCF mode, a STA needs to sense the status of the wireless channel before the STA can place its request to transmit a frame. AIFS is used by quality of service (QoS) STAs to transmit all data frames management frames (e,g., MAC management protocol data units (MMPDUs)) and control frames (e.g., power save-poll (PS-Poll), RTS, CTS).

OFDMA is an OFDM-based multiple access scheme where different subsets of subcarriers are allocated to different users, allowing simultaneous data transmission to or from one or more users with high accurate synchronization for frequency orthogonality.

Figure 4:
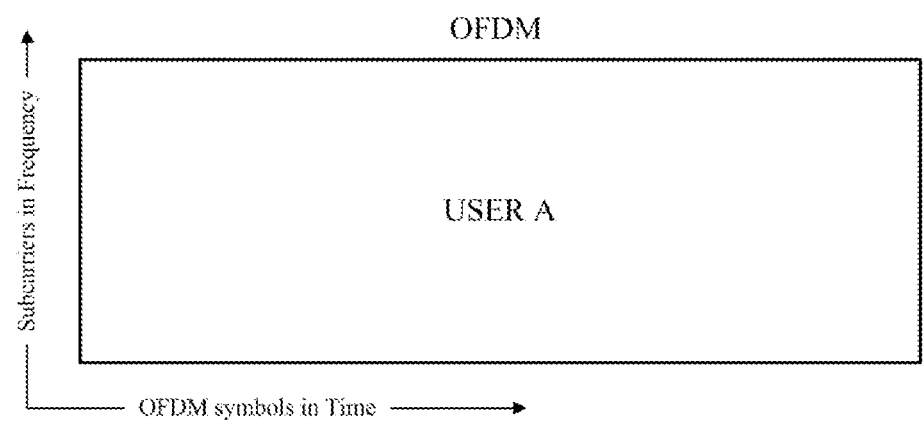
FIG. 4 illustrates difference between OFDM and OFDMA according to an embodiment of the present disclosure.
Figure 4:
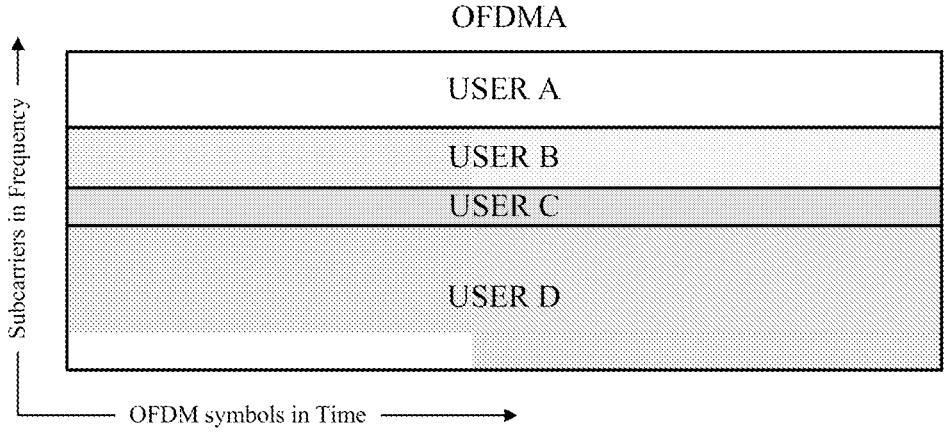

FIG. 4 illustrates difference between OFDM and OFDMA according to an embodiment of the present disclosure.

Referring to FIG. 4, in OFDM, a single user (e.g., USER A) is allocated whole subcarriers, while, in OFDMA, a plurality of users (e.g., USER A, USER B, USER C, and USER D) are allocated different subsets of subcarriers which can change from one physical layer convergence protocol (PLCP) protocol data unit (PPDU) to the next. In OFDMA, an OFDM symbol is constructed of subcarriers, the number of which is a function of the PPDU bandwidth.

In case of UL MU transmission, given different STAs with its own capabilities and features, AP may want to have more control mechanism of the medium by using more scheduled access, which may allow more frequent use of OFDMA/MU-MIMO transmissions. PPDUs in UL MU transmission (MU-MIMO or OFDMA) are sent as a response to the Trigger frame sent by the AP. Here, UL MU transmission consists of response frames (e.g., HE (or EHT) trigger-based (TB) PPDU) to a Trigger frame sent by the AP wherein the Trigger frame is supposed to have enough STA's information and assigned RUs. This allows specific STA to transmit the OFDMA based packet format with HE (or EHT) TB PPDU wherein HE (or EHT) TB PPDU is segmented into RU and all RUs as a response of Trigger frame are allocated to the selected non-AP STAs accordingly.

Figure 5:
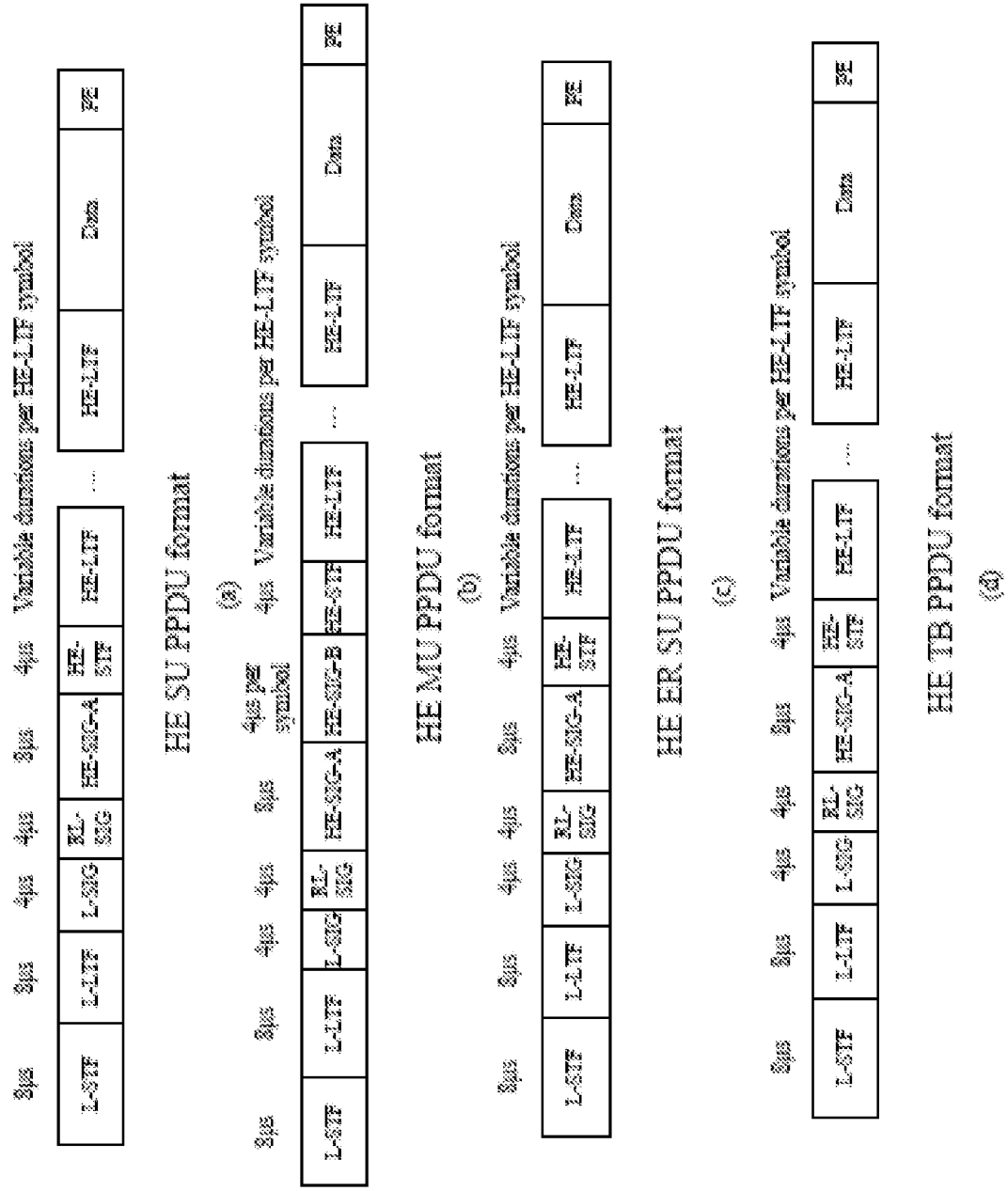
FIG. 5 illustrates an example of HE PPDU format according to an embodiment of the present disclosure.

FIG. 5 illustrates an example of HE PPDU format according to an embodiment of the present disclosure.

Referring to FIG. 5, in HE WLAN, the four HE PPDU formats are defined: HE SU PPDU for single user transmission ((A) of FIG. 5)), HE MU PPDU for multi-user transmission ((B) of FIG. 5)), HE ER SU PPDU for single user to cover extended coverage ((C) of FIG. 5)), and HE TB PPDU for UL multi-user transmission from STAs ((D) of FIG. 5)). The HE PHY supports a discrete Fourier transform (DFT) period of 3.2 us and 12.8 us for the pre-HE modulated fields and the HE modulated fields in an HE PPDU respectively. The HE PHY data subcarrier frequency spacing in a quarter of legacy very high throughput (VHT), HT PHY, which enables HE modulated OFDM symbol to have almost 4 multiples of data subcarriers. The fields of the HE PPDU formats are summarized in Table 1 and the L-STF, L-LTF, L-SIG, RL-SIG, HE-SIG-A, and HE-SIG-B fields are referred to as the Pre-HE modulated fields, while HE-STF, HE-LTF and Data fields are referred to as the HE modulated fields.

TABLE 1

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| HE-SIG-A | HE SIGNAL A field |
| HE-SIG-B | HE SIGNAL B field |
| HE-STF | HE Short Training field |
| HE-LTF | HE Long Training field |
| Data | The Data fieldcarrying the PSDU(s) |
| PE | Packet extension field |

Figure 6:
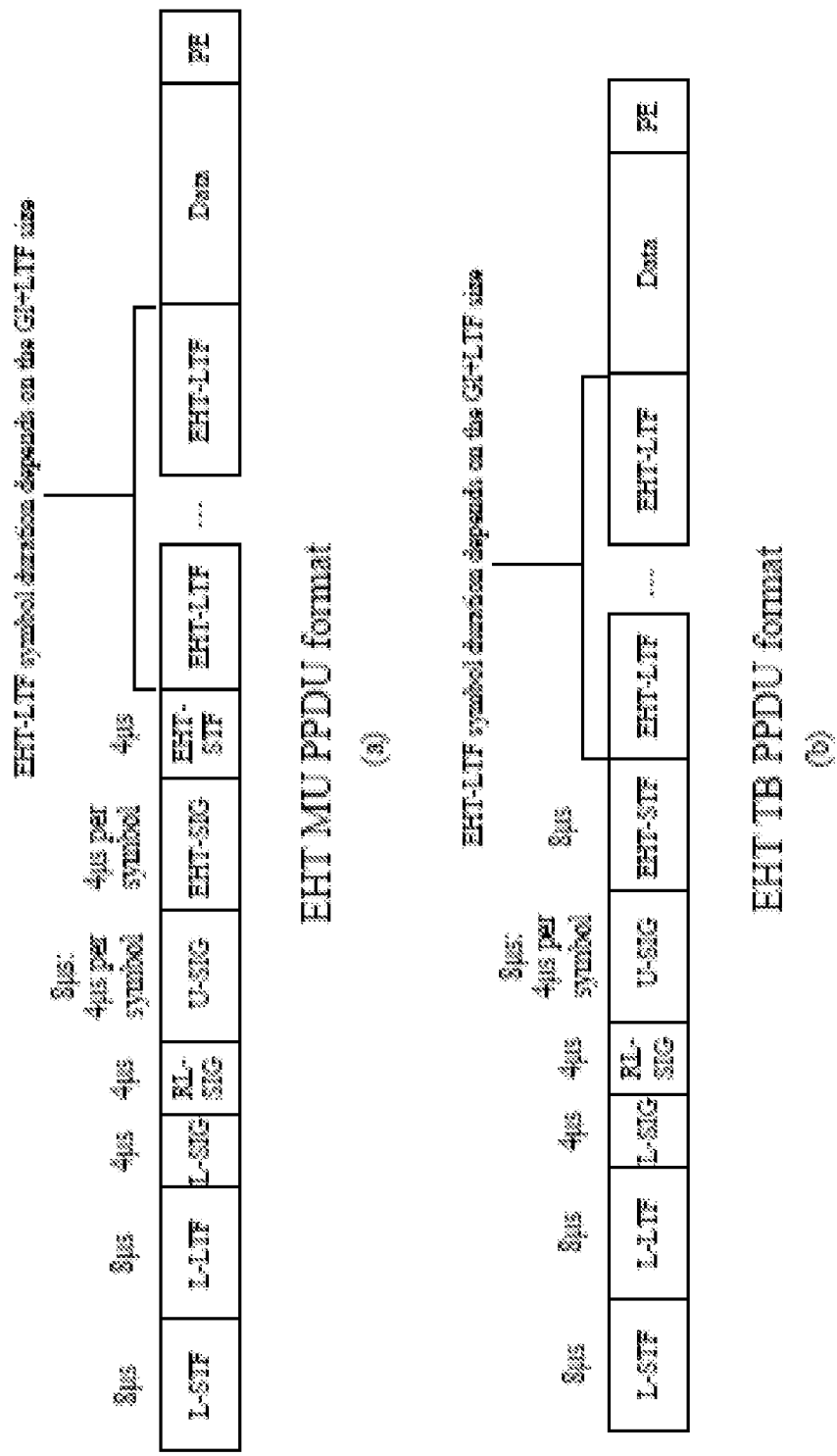
FIG. 6 illustrates an example of EHT PPDU format according to an embodiment of the present disclosure.

FIG. 6 illustrates an example of EHT PPDU format according to an embodiment of the present disclosure.

Referring to FIG. 6, in EHT, two EHT PPDU formats are defined: EHT MU PPDU ((a) of FIG. 6)) and EHT TB PPDU ((b) of FIG. 6)). EHT MU PPDU is used for both single user transmission and multi-user transmission. The EHT MU PPDU is not a response to a triggering frame. In the EHT MU PPDU, the EHT-SIG field is present. EHT TB PPDU is used for a transmission that is a response to a triggering frame from an AP. In the EHT TB PPDU, the EHT-SIG field is not present. The fields of the EHT PPDU formats are summarized in Table 2.

TABLE 2

| Field | Description |
|---|---|
| L-STF | Non-HT Short Training field |
| L-LTF | Non-HT Long Training field |
| L-SIG | Non-HT SIGNAL field |
| RL-SIG | Repeated Non-HT SIGNAL field |
| U-SIG | Universal SIGNAL field |
| EHT-SIG | EHT SIGNAL field |
| EHT-STF | EHT Short Training field |
| EHT-LTF | EHT Long Training field |
| Data | The Data field carrying the PSDU(s) |
| PE | Packet extension field |

The concept of preamble puncturing has been introduced since 11ax. It is a mechanism whereby OFDMA is used to avoid transmissions in certain subcarriers. For PPDU bandwidths greater than or equal to 80 MHz, the HE PHY supports preamble punctured HE MU PPDU transmissions where pre-HE modulated fields (before HE STF field) are not transmitted in one or more of the nonprimary 20 MHz subchannels, and RUs associated with those punctured 20 MHz subchannels are not allocated. In HE MU PPDU, there is a field to indicate which subchannels are punctured.

In 11be, preamble puncturing is applicable to OFDMA transmission and non-OFDMA transmission (single user transmission or full bandwidth MU-MIMO transmission). In PHY, the puncturing patterns are defined in the Punctured Channel Information field in EHT MU PPDU. For OFDMA cases, a 4-bit bitmap that tells which 20 MHz subchannel is punctured in the relevant 80 MHz subblock is defined where a value of 0 indicates that the corresponding 20 MHz subchannel is punctured. The allowed punctured patterns are defined for an 80 MHz subblock: 1111, 0111, 1011, 1101, 1110, 0011, 1100, and 1001. Its value could be variable for each 80 MHz subblock when channel operating bandwidth is larger than 80 MHz. For non-OFDMA cases, 5 bit of punctured channel indication is used to signal the non-OFDMA puncturing pattern of the entire PPDU bandwidth as shown in Table 3.

TABLE 3

| PPDU bandwidth | Cases | Puncturing pattern | Field value |
|---|---|---|---|
| 20/40 MHz | No puncturing | [1 1 1 1] | 0 |
| 80 MHz | No puncturing | [1 1 1 1] | 0 |
|  | 20 MHz puncturing | [x 1 1 1] | 1 |
|  |  | [1 x 1 1] | 2 |
|  |  | [1 1 x 1] | 3 |
|  |  | [1 1 1 x] | 4 |
| 160 MHz | No puncturing | [1 1 1 1 1 1 1 1] | 0 |
|  | 20 MHz puncturing | [x 1 1 1 1 1 1 1] | 1 |
|  |  | [1 x 1 1 1 1 1 1] | 2 |
|  |  | [1 1 x 1 1 1 1 1] | 3 |
|  |  | [1 1 1 x 1 1 1 1] | 4 |

TABLE 3-continued

| PPDU bandwidth | Cases | Puncturing pattern | Field value |
|---|---|---|---|
|  |  | [1 1 1 1 x 1 1 1] | 5 |
|  |  | [1 1 1 1 1 x 1 1] | 6 |
|  |  | [1 1 1 1 1 1 x 1] | 7 |
|  |  | [1 1 1 1 1 1 1 x] | 8 |
|  | 40 MHz puncturing | [x x 1 1 1 1 1 1] | 9 |
|  |  | [1 1 x x 1 1 1 1] | 10 |
|  |  | [1 1 1 1 x x 1 1] | 11 |
|  |  | [1 1 1 1 1 1 x x] | 12 |
| 320 MHz | No puncturing | [1 1 1 1 1 1 1 1] | 0 |
|  | 40 MHz puncturing | [x 1 1 1 1 1 1 1] | 1 |
|  |  | [1 x 1 1 1 1 1 1] | 2 |
|  |  | [1 1 x 1 1 1 1 1] | 3 |
|  |  | [1 1 1 x 1 1 1 1] | 4 |
|  |  | [1 1 1 1 x 1 1 1] | 5 |
|  |  | [1 1 1 1 1 x 1 1] | 6 |
|  |  | [1 1 1 1 1 1 x 1] | 7 |
|  |  | [1 1 1 1 1 1 1 x] | 8 |
|  | 80 MHz puncturing | [x x 1 1 1 1 1 1] | 9 |
|  |  | [1 1 x x 1 1 1 1] | 10 |
|  |  | [1 1 1 1 x x 1 1] | 11 |
|  |  | [1 1 1 1 1 1 x x] | 12 |
|  | 320-80-40 | [x x x 1 1 1 1 1] | 13 |
|  |  | [x x 1 x 1 1 1 1] | 14 |
|  |  | [x x 1 1 x 1 1 1] | 15 |
|  |  | [x x 1 1 1 x 1 1] | 16 |
|  |  | [x x 1 1 1 1 x 1] | 17 |
|  |  | [x x 1 1 1 1 1 x] | 18 |
|  |  | [x 1 1 1 1 1 x x] | 19 |
|  |  | [1 x 1 1 1 1 x x] | 20 |
|  |  | [1 1 x 1 1 1 x x] | 21 |
|  |  | [1 1 1 x 1 1 x x] | 22 |
|  |  | [1 1 1 1 x 1 x x] | 23 |
|  |  | [1 1 1 1 1 x x x] | 24 |

Note that in the puncturing patterns in Table 3 above, a "1" denotes a non-punctured subchannel and an "x" denotes a punctured subchannel. The puncturing granularity for 80 MHz and 160 MHz PPDU bandwidth is 20 MHz, and the puncturing granularity for 320 MHz PPDU bandwidth is 40 MHz.

In 11be, preamble puncturing is appliable to different type of frames. The indication of which subchannels are punctured in a control (e.g., RTS, MU-RTS Trigger, CTS or etc), data or management frame that is carried in a non-HT duplicate PPDU can be conveyed from the MAC to the PHY through the TXVECTOR parameter INACTIVE_SUBCHANNELS. The parameter INACTIVE_SUBCHANNELS may be present in the TXVECTOR of a non-HT duplicate PPDU or EHT PPDU that carries a control, data or management frame. Given 11be supporting up to 320 MHz channel bandwidth, size of the parameter INACTIVE_SUBCHANNELS should be 16 bits. For the new amendments, the basic assumption is that now the parameter INACTIVE SUB CHANNELS could be used in not only non-HT duplicate PPDU but also EHT PPDU. And puncturing pattern signaling is not limited to NDP Announcement frame or NDP frame.

Given at least two different types of indication being defined, there is need to set up a rule. On top of that, the indication could be dynamic or static.

Figure 7:
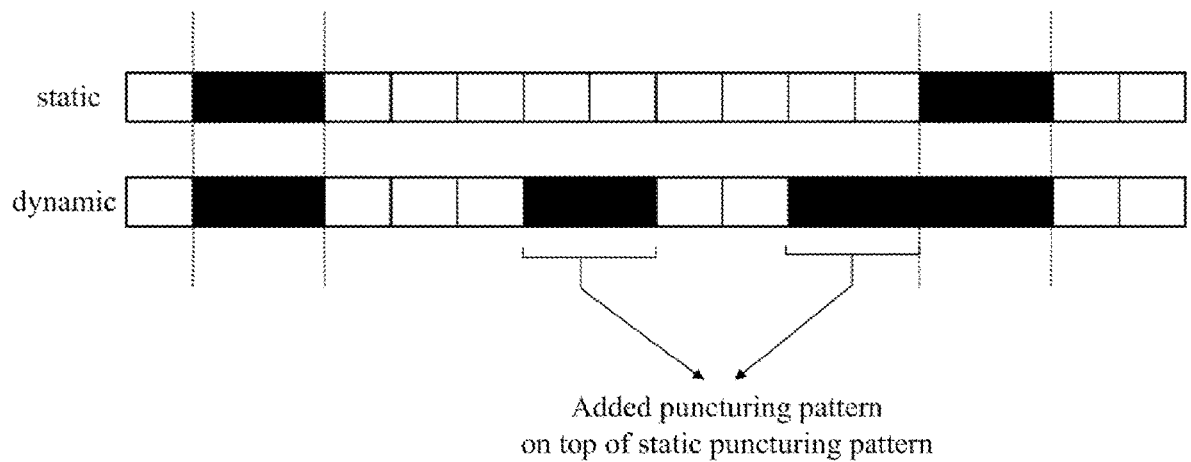
FIG. 7 illustrates different types of puncturing channel indication according to an embodiment of the present disclosure.

FIG. 7 illustrates different types of puncturing channel indication according to an embodiment of the present disclosure.

Figure 8:
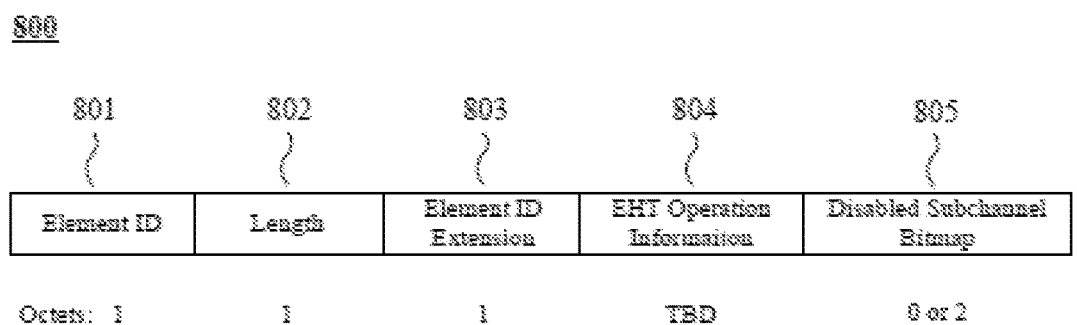
FIG. 8 illustrates an example of the EHT Operation element format according to an embodiment of the present disclosure.

Referring to FIG. 7, a static puncturing channel indication is likely to reflect the local regulation and channel characteristics which do not allow some specific channels for the BSS. It means at least those channels are likely to be punctured for a relatively long time. For example, the static puncturing channel indication could be provided with the EHT Operation element as shown in FIG. 8 below wherein this element could be carried in a management frame such as a beacon frame. Once the management frame including the static puncturing channel indication is received, the puncturing pattern for the static puncturing channel indication could be used unless additional indication (e.g., the dynamic puncturing channel indication or another static puncturing channel indication) is not correctly received. On the other hand, the dynamic puncturing indication could be dynamically updated in accordance with the channel measurement depending on the circumstances. For example, the dynamic puncturing indication should contain the static puncturing pattern.

FIG. 8 illustrates an example of the EHT Operation element format according to an embodiment of the present disclosure.

Referring to FIG. 8, the format of the EHT Operation element 800 includes Element ID field 801, Length field 802, Element ID Extension field 803, EHT Operation Information field 804 and Disabled Subchannel Bitmap field 805. The EHT Operation element is identified by the Element ID field 801 and, if present, the Element ID Extension field 803. The Length field 802 indicates the number of octets in the EHT Operation element excluding the Element ID field 801 and the Length field 802. The subfields of the EHT Operation information field 804 are defined in Table 4. Referring to Table 4, the EHT Operation information field 804 includes Channel Width subfield, channel center frequency segment (CCFS) information field, and Disabled Subchannel Bitmap Present subfield. The Channel Width subfield indicates the EHT BSS channel width set to 0 for 20 MHz, 1 for 40 MHz, 2 for 80 MHz, 3 for 160 MHz, and 4 for 320 MHz and CCFS information subfield indicates the channel center frequency for a 20, 40, 80, 160 or 320 MHz EHT BSS. The Disabled Subchannel Bitmap Present subfield indicates whether the Disabled Subchannel Bitmap field 805 is present. For example, the Disabled Subchannel Bitmap field 805 is present if the Disabled Subchannel Bitmap Present subfield is 1, otherwise, the Disabled Subchannel Bitmap field 805 is not present. The Disabled Subchannel Bitmap field 805 provides the static puncturing channel indication indicating a list of subchannels that are punctured within the BSS bandwidth, if present.

example, since 11ax STAs capable of 80/160 MHz operation decode the preamble on primary 20 MHz subchannel first to get the control information (e.g. bandwidth information) from SIG field to decode further the rest portion of the PPDU, 11ax STAs are likely to stay at least within primary 80 MHz channel (or the primary 160 MHz channel). To increase the efficiency, a new mechanism could be introduced. For example, the new mechanism enables multiplexing of EHT STAs with different amendment compliant devices such as 11ax or beyond EHT STAs (EHT+STAs).

Figure 9:
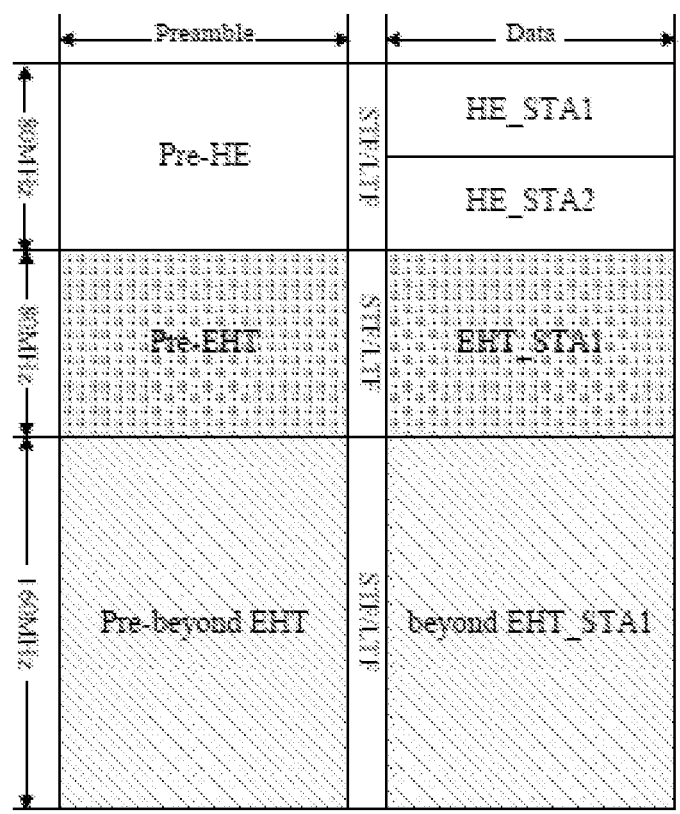
FIG. 9 illustrates an example of A-PPDU according to an embodiment of the present disclosure.

FIG. 9 illustrates an example of A-PPDU according to an embodiment of the present disclosure.

Referring to FIG. 9, A (aggregated)-PPDU includes multiple sub-PPDUs. The pre-HE, pre-EHT, and pre-beyond EHT denote the preamble parts of sub-PPDUs for three different amendments, i.e., HE, EHT, and beyond EHT, respectively. Each sub-PPDU could occupy non-overlapping of frequency segments where the sub-PPDUs are orthogonal in frequency domain symbol-by-symbol. A-PPDU could be transmitted in both downlink and uplink. Hereafter, once this present disclosure describes that certain features are supported for EHT devices, it could be applicable for beyond EHT without any additional description.

The 11ax devices camp on the primary 80 MHz channel (or the primary 160 MHz channel) and fully reuse the 11ax processing procedure. In terms of the HE STAs, all flows should be transparent during the multiplexing period time. As for EHT and EHT+STAs, those STAs can figure out the new rules to be defined and process its own assigned portion correctly. The new structure and rule could contain the method that EHT and EHT+devices could camp on secondary channels. Without information on the primary 20 MHz subchannel or with the information previously being shared before this procedure based on SST (subchannel selective transmission) operation, those devices can work out. In order to support those new structure to multiplex different amendment STAs, there are several requirements such as consistent tone spacing between different amendment STAs, symbol alignment by the same tone spacing or the same GI values or same MCS for SIG portion or data portion between 80 MHz segments or 160 MHz segment depending on the STAs capable bandwidth.

The SST operation is introduced as one of 11ax capabilities. An HE AP shall not allocate an RU outside of the

TABLE 4

| Subfield | Definition | Encoding |
|---|---|---|
| Channel Width | This field defines the EHT BSS bandwidth. | Set to 0 for 20 MHz EHT BSS bandwidth. Set to 1 for 40 MHz EHT BSS bandwidth. Set to 2 for 80 MHz EHT BSS bandwidth. Set to 3 for 160 MHz EHT BSS bandwidth. Set to 4 for 320 MHz EHT BSS bandwidth. Other values are reserved. |
| CCFS | TBD | TBD |
| Disabled Subchannel Bitmap Present | Indicates whether the Disabled Subchannel Bitmap field is present or not. | Set to 1 if the Disabled Subchannel Bitmap field is present; set to 0 otherwise. |

Considering wider bandwidth such as 320 MHz channel bandwidth on 6 GHz, it might be hard for one STA to occupy entire bandwidth because of incumbent devices or previous amendment devices (e.g. 11ax compliant devices). For primary 80 MHz channel in a 160 MHz or 80+80 MHz HE MU or HE TB PPDU to an 80 MHz operating non-AP HE STA if the non-AP STA has set the HE Subchannel Selective Transmission Support subfield in the HE MAC Capabilities Information field in the HE Capabilities element to 0. An HE AP shall not allocate an RU outside of the primary 80 MHz subchannel in a 160 MHz or 80+80 MHz HE MU or HE TB PPDU to an 80 MHz operating non-AP HE STA if the non-AP STA has set the HE Subchannel Selective Transmission Support subfield in the HE MAC Capabilities Information field in the HE Capabilities element to 1 but has not set up SST operation on the secondary 80 MHz channel with the HE AP. The TXVECTOR parameter CH_BANDWIDTH (e.g. Channel bandwidth information) of a DL MU PPDU is not set to HE-CBWPUNC160-PRI20, HE-CBW-PUNC80+80-PRI20, HE-CBW-PUNC160-SEC40 or HE-CBWPUNC80+80-SEC40 (e.g. punctured channel bandwidth defined in the bandwidth information in 11ax) if the DL MU PPDU is addressed to at least one HE SST non-AP STA that is an 80 MHz operating STA operating in a secondary subchannel. It means if capabilities allowed, non-punctured RU (contiguous 20, 40, or 80 MHz PPDU) could be assigned to the secondary 80 MHz channel within 160 MHz channel supported in SST operation in 11ax. In order to support this new PPDU format as the A-PPDU, while a new trigger frame for a new amendment should be transparent to HE STAs (or previous amendment compliant STAs), it also carries additional control information for EHT or EHT+STAs wherein some fields in the new trigger frame could be reinterpreted only for EHT STAs (or EHT+STAs). Depending on the capabilities, a first capable AP shall not transmit a Trigger frame that solicit both HE TB PPDUs and EHT TB PPDU together while a second capable AP transmits a Trigger frame that solicits both HE TB PPDUs and EHT TB PPDUs. The first capable APs and STAs can be used for release 1 (as R1 devices) and the second capable APs and STAs can be used for release 2 (as R2 devices) in this present disclosure.

The new Trigger frame carries the different Common Info fields and User Info fields depending on the HE variant format or EHT variant format to be solicited.

Figure 10A:
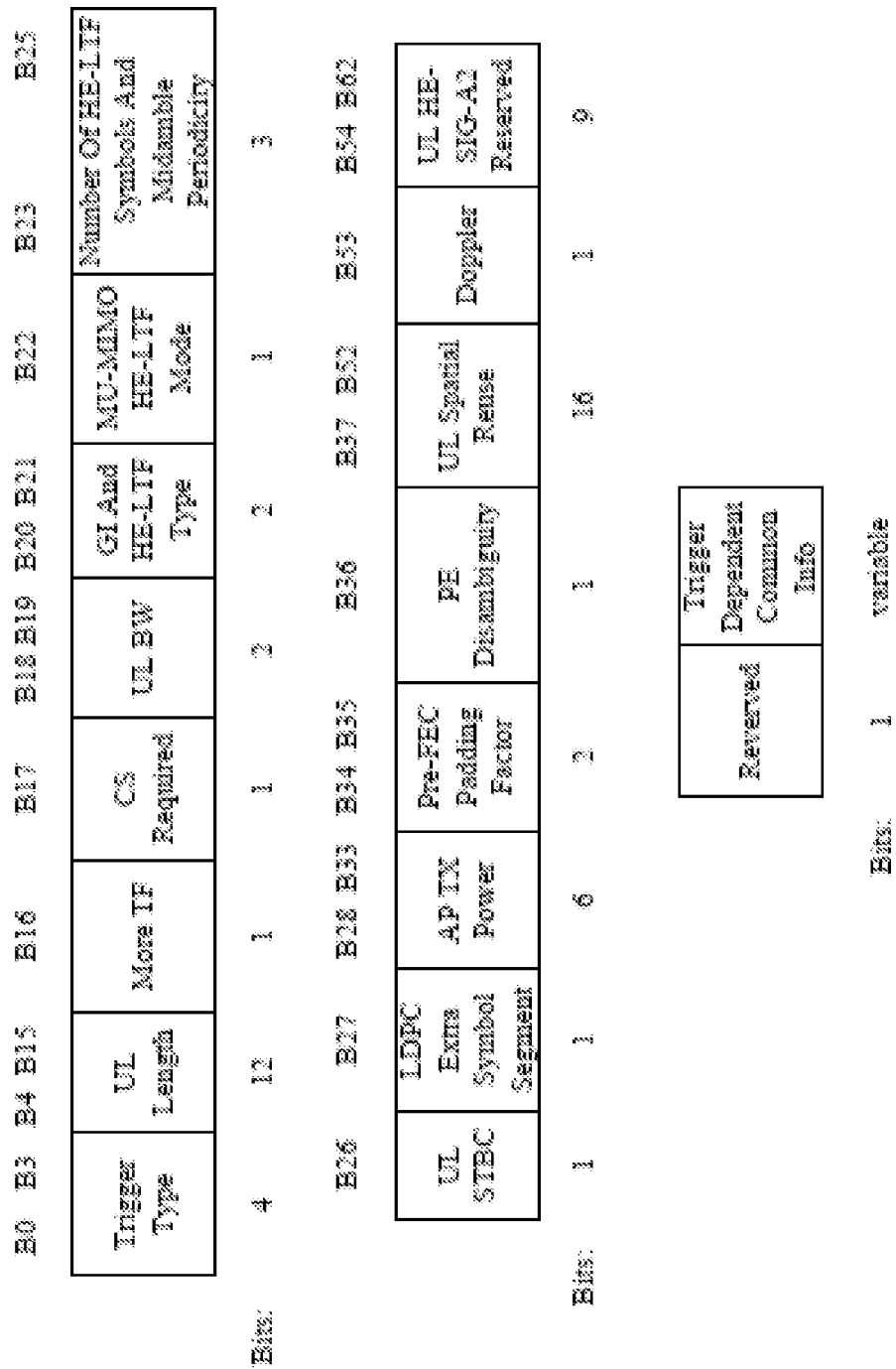

FIGS. 10A and 10B illustrate an example of the Common Info field in the new Trigger frame according to an embodiment of the present disclosure. A FIG. 10A is an example of Common Info field in 11ax and a FIG. 10B is an example of Common Info field in11be.

Referring to FIGS. 10A and 10B, the UL HE-SIG-A2 Reserved subfield is set to all 1s in 11ax (FIG. 10A) while B54 and B55 are assigned as common information for EHT STAs (FIG. 10B). B54, the HE/EHT P160 subfield indicates whether EHT STA to transmit an HE or EHT TB PPDU within the primary 160 MHz channel. The HE/EHT P160 subfield is set to 1 to carry HE TB PPDU and set to 0 to carry EHT TB PPDU. B55, the Special User Info Field Flag subfield, indicates whether EHT STA is present or not. The Special User Info Field Flag subfield is set to 1 to carry no Special User Info field, and set to 0 to carry the Special User Info field.

Figure 11:
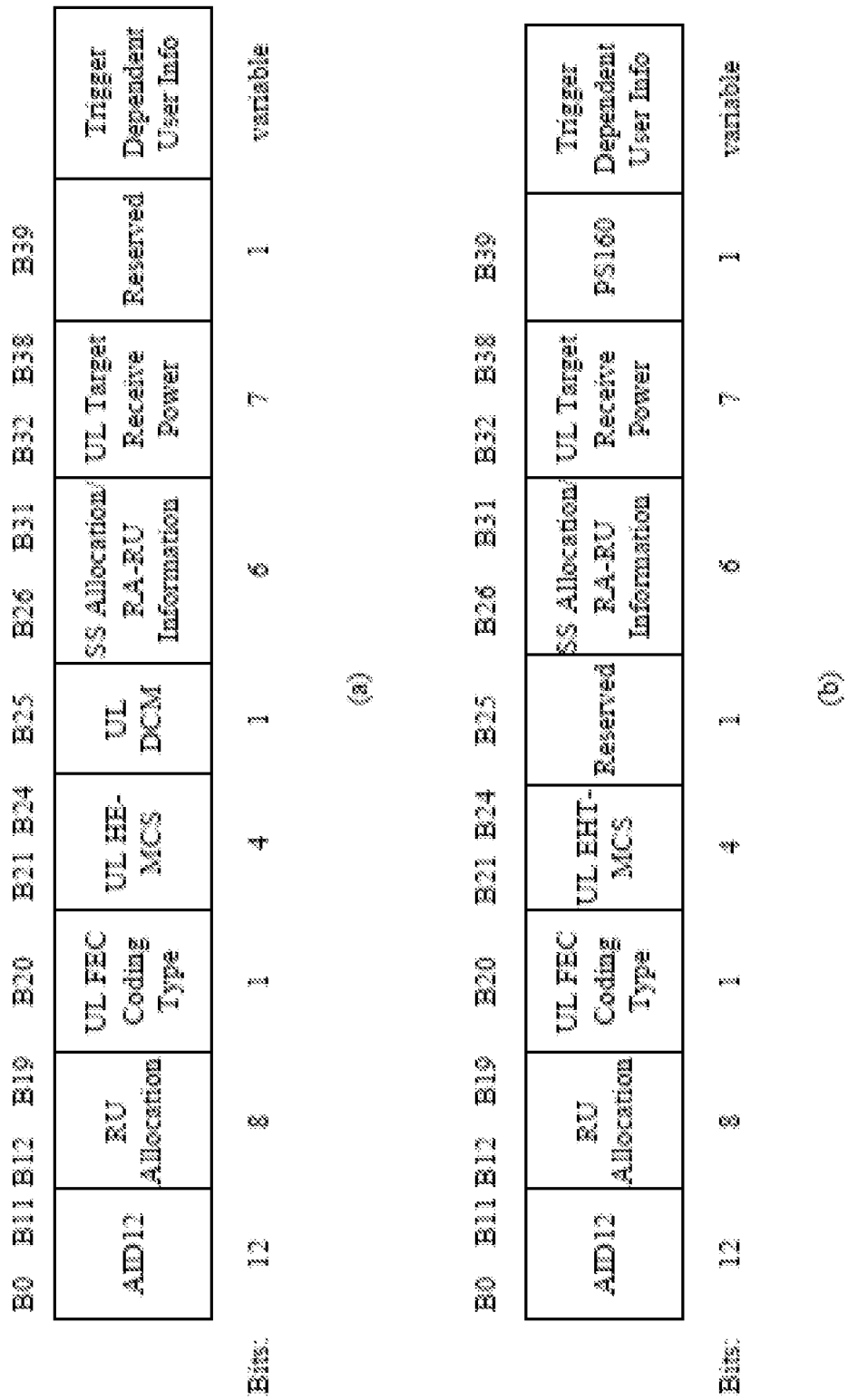
FIG. 11 illustrates an example of the User Info field in the new Trigger frame according to an embodiment of the present disclosure.

FIG. 11 illustrates an example of the User Info field in the new Trigger frame according to an embodiment of the present disclosure. A (a) of FIG. 11 is an example of User Info field in 11ax and a (b) of FIG. 11 is an example of User Info field in 11be.

Referring to FIG. 11, the new Trigger frame carries the different User Info field on the HE variant format or EHT variant format. For example, in 11be, RU Allocation subfield and B39, PS160 field, of User Info field are jointly encoded to indicate the location of RU and MRU assigned to each EHT STAs as shown in the Table 5.

TABLE 5

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| | 0-3: 80 MHz segment where the RU is located | 0-8 | 20, 40, 80, 160, or 320 | 26 | RUI to RU9, respectively | 37'N + RU index |
| | | 9-17 | 40, 80, 160, or 320 | | RU10 to RU18, respectively | |
| | | 18 | 80, 160, or 320 | | Reserved | |
| | | 19-36 | 80, 160, or 320 | | RU20 to RU37 respectively | |
| | | 37-40 | 20, 40, 80, 160, or 320 | 52 | RU1 to RU4, respectively | 16'N + RU index |
| | | 41-44 | 40, 80, 160, or 320 | | RU5 to RU8, respectively | |
| | | 45-52 | 80, 160, or 320 | | RU9 to RU16, respectively | |
| | | 53, 54 | 20, 40, 80, 160, or 320 | 106 | RU1 and RU2, respectively | 8'N + RU index |
| | | 55, 56 | 40, 80, 160, or 320 | | RU3 and RU4, respectively | |
| | | 57-60 | 80, 160, or 320 | | RU5 to RU8, respectively | |
| | | 61 | 20, 40, 80, 160, or 320 | 242 | RU1 | 4'N + RU index |
| | | 62 | 40, 80, 160, or 320 | | RU2 | |

TABLE 5-continued

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| | | 63, 64 | 80, 160, or 320 | | RU3 and RU4, respectively | |
| | | 65 | 40, 80, 160, or 320 | 484 | RU1 | 2'N + RU index |
| | | 66 | 80, 160, or 320 | | RU2 | |
| | | 67 | 80, 160, or 320 | 996 | RU1 | N + RU index |
| 0-1: 160 MHz where the RU is located segment | 0 | 68 | | Reserved | | Reserved |
| | 1 | | 160 or 320 | 2'996 | RU1 | X1 + RU index |
| 0 | 0 | 69 | | Reserved | | Reserved |
| 0 | 1 | | | | | |
| 1 | 0 | | | | | |
| 1 | 1 | | 320 | 4'996 | RU1 | RU1 |
| | 0-3: 80 MHz segment where the RU is located | 70-72 | 20, 40, 80, 160, or 320 | 52 + 26 | MRU1 to MRU3, respectively | 12'N + MRU index |
| | | 73-75 | 40, 80, 160, or 320 | 52 + 26 | MRU4 to MRU6, respectively | |
| | | 76-81 | 80, 160, or 320 | 52 + 26 | MRU7 to MRU12, respectively | |
| | | 82, 83 | 20, 40, 80, 160, or 320 | 106 + 26 | MRU1 and MRU2, respectively | 8'N + MRU index |
| | | 84, 85 | 40, 80, 160, or 320 | 106 + 26 | MRU3 and MRU4, respectively | |
| | | 86-89 | 80, 160, or 320 | 106 + 26 | MRU5 to MRU8, respectively | |
| | | 90-93 | 80, 160, or 320 | 484 + 242 | MRU1 to MRU4, respectively | 4'N + MRU index |
| 0-1: 160 MHz segment where the MRU is located | 0 | 94, 95 | 160 or 320 | 996 + 484 | MRU1 and MRU2, respectively | 4'X1 + MRU index |
| | 1 | | | | MRU3 and MRU4, respectively | |
| 0-1: 160 MHz segment where the MRU is located | 0 | 96-99 | 160 or 320 | 996 + 484 + 242 | MRU1 to MRU4, respectively | 8'X1 + MRU index |
| | 1 | | | | MRU5 to MRU8, respectively | |
| 0 | 0 | 100-103 | 320 | 2'996 + 484 | MRU1 to MRU4, respectively | MRU index |
| 0 | 1 | | | | MRU5 and MRU6, respectively | |
| 1 | 0 | | | | MRU7 and MRU8, respectively | |
| 1 | 1 | | | | MRU9 to MRU12, respectively | |
| 0 | 0 | 104 | 320 | 3'996 | MRU1 | MRU index |
| 0 | 1 | | | | MRU2 | |
| 1 | 0 | | | | MRU3 | |
| 1 | 1 | | | | MRU4 | |
| 0 | 0 | 105, 106 | 320 | 3'996 + 484 | MRU1 and MRU2, respectively | MRU index |
| 0 | 1 | | | | MRU3 and MRU4, respectively | |

TABLE 5-continued

| PS160 subfield | B0 of the RU Allocation subfield | B7-B1 of the RU Allocation subfield | Bandwidth (MHz) | RU/MRU size | RU/MRU index | PHY RU/MRU index |
|---|---|---|---|---|---|---|
| 1 | 0 | | | | MRU5 and MRU6, respectively | |
| 1 | 1 | | | | MRU7 and MRU8, respectively | |
| Any | Any | 107-127 | Any | Reserved | Reserved | Reserved |

NOTE
B0 of the RU Allocation subfield is set to 0 to indicate that the RU/MRU allocation applies to the primary 80 MHz channel and set to 1 to indicate that the RU allocation applies to the secondary 80 MHz channel in the primary 160 MHz channel. B0 of the RU Allocation subfield is set to 0 to indicate that the RU/MRU allocation applies to the lower 80 MHz channel in the secondary 160 MHz channel and is set to 1 to indicate that the RU allocation applies to upper 80 MHz channel in the secondary 160 MHz channel.

Figure 12:
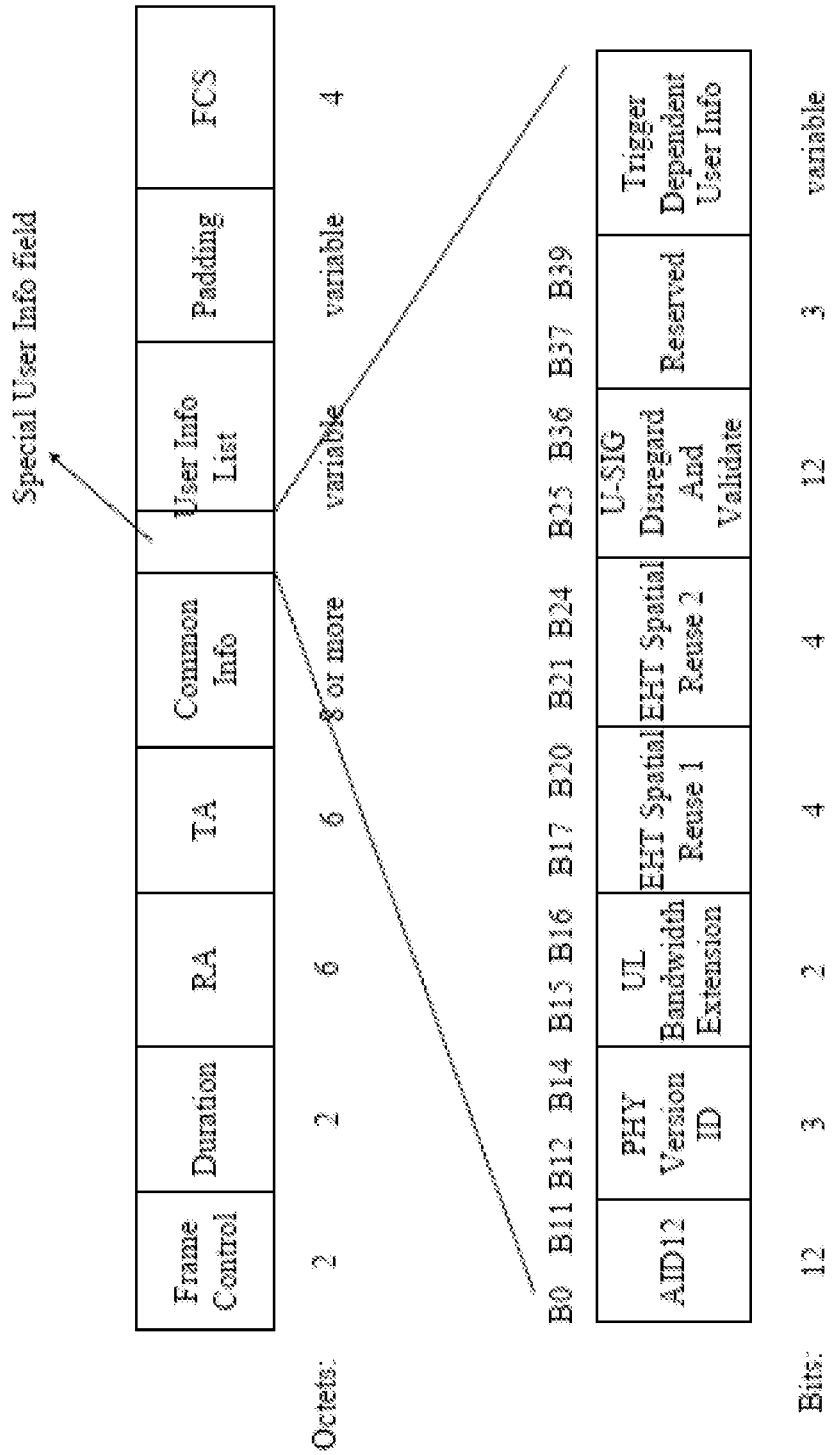
FIG. 12 illustrates an example of Special User Info field according to an embodiment of the present disclosure.

FIG. 12 illustrates an example of Special User Info field according to an embodiment of the present disclosure.

Referring to FIG. 12, the Special User Info field, if present, is located immediately after Common Info field in the new Trigger frame. The Special User Info field is a User Info field that does not carry the user specific information but carries the additional common information not provided in the Common Info field. The Special User Info field is identified by the AID12 value of 2007 which is not assigned to EHT STAs (still allowed as AID for 11ax STAs). The PHY Version ID subfield in the Special User Info field is set to 0 for EHT STAs.

Considering more than two types of TB PPDUs (e.g. HE, EHT or EHT+TB PPDUs) combined to be triggered together, WLAN needs to consider how to expand the Special User Info field for future amendments. In addition to the Special User Info field for EHT STAs, more Special User Info fields are likely to be carried in the Trigger frame to encode the common information for EHT+STAs. Note that a first Special User Info field is a Special User field which locates before a second Special User Info field. Those two Special User Info fields are not necessarily located next to each other. There is a need to define a first field (e.g. the second Special User Info Field Flag subfield) to indicate whether more Special User Info field is followed. Also, there is a need to define where to place the first field, if present, in the Trigger frame. Therefore, the present disclosure defines the first field in the Trigger frame through several examples according to FIG. 13, FIG. 14 and FIG. 15 as follows.

Figure 13:
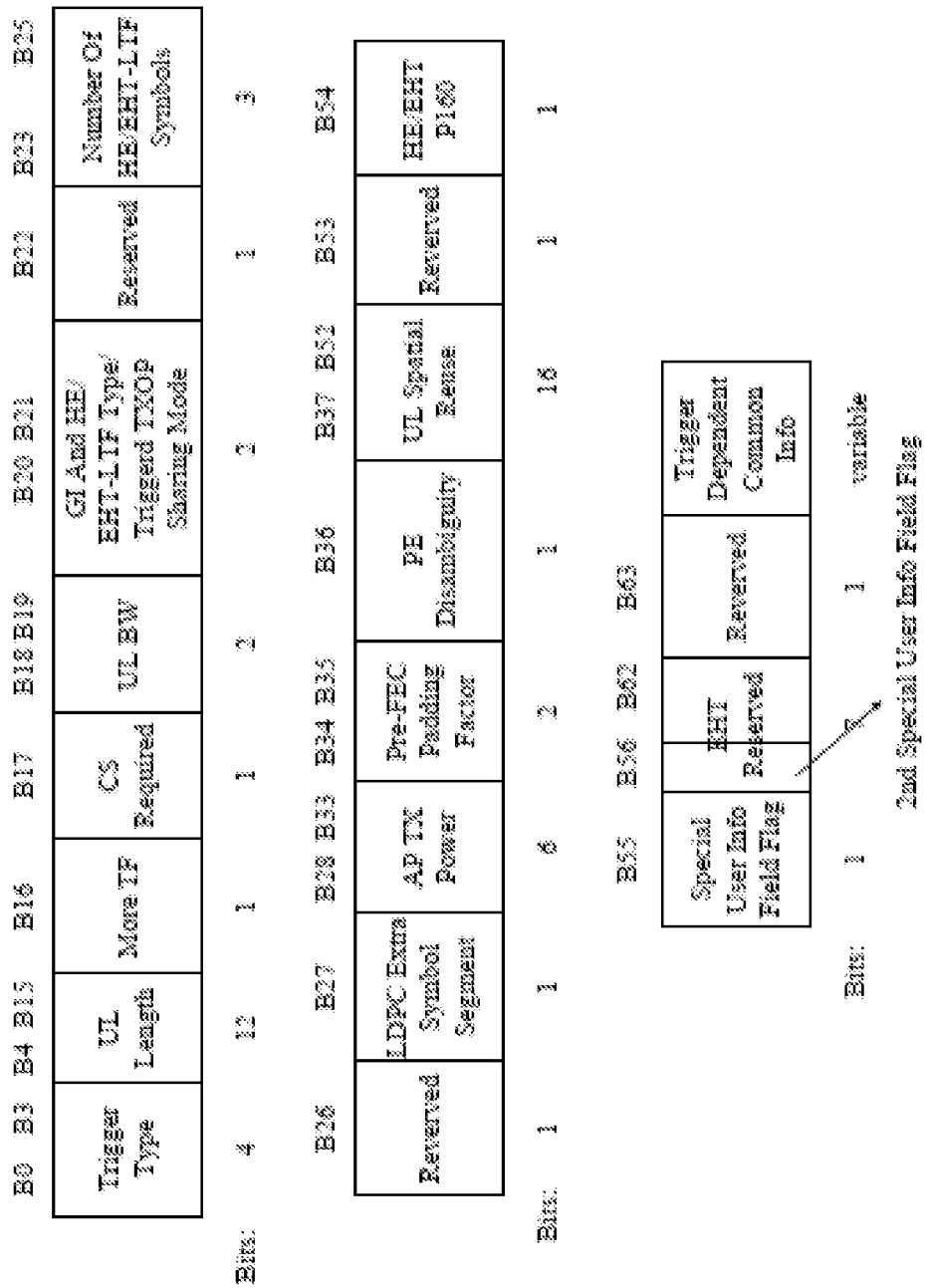
FIG. 13 illustrates an example of the first field included in the Common Info field according to an embodiment of the present disclosure.

FIG. 13 illustrates an example of the first field included in the Common Info field according to an embodiment of the present disclosure.

Referring to FIG. 13, the first field could be included in the Common Info field. For example, some of B56 to B62 of the Common Info field are assigned as the first field. The first field could indicate whether the second Special User Info field is present or not. Or the first field and B55 could jointly indicate whether the second Special User Info field is present. The second Special User Info field, if present, may be not located immediately after the first Special User Info field. In this case, each Special User Info field is followed by the corresponding variant TB PPDUs. For example, the first Special User Info field is followed by the User Info field for the first variant and the second Special User Info field is followed by the User Info field for the second variant. Each Special User Info field contains different AID. For example, the AID12 in the first Special User Info field carries 2007 while the AID12 in the second Special User Info field carries 2006 wherein 2006 could be assigned to 11ax and 11be not for EHT+STA. A value of PHY Version ID field in different Special User Info field could be different to solicit different variant User Info field. In this case, 2007 could be used regardless of the soliciting TB PPDUs (e.g. EHT, EHT+, etc).

Figure 14:
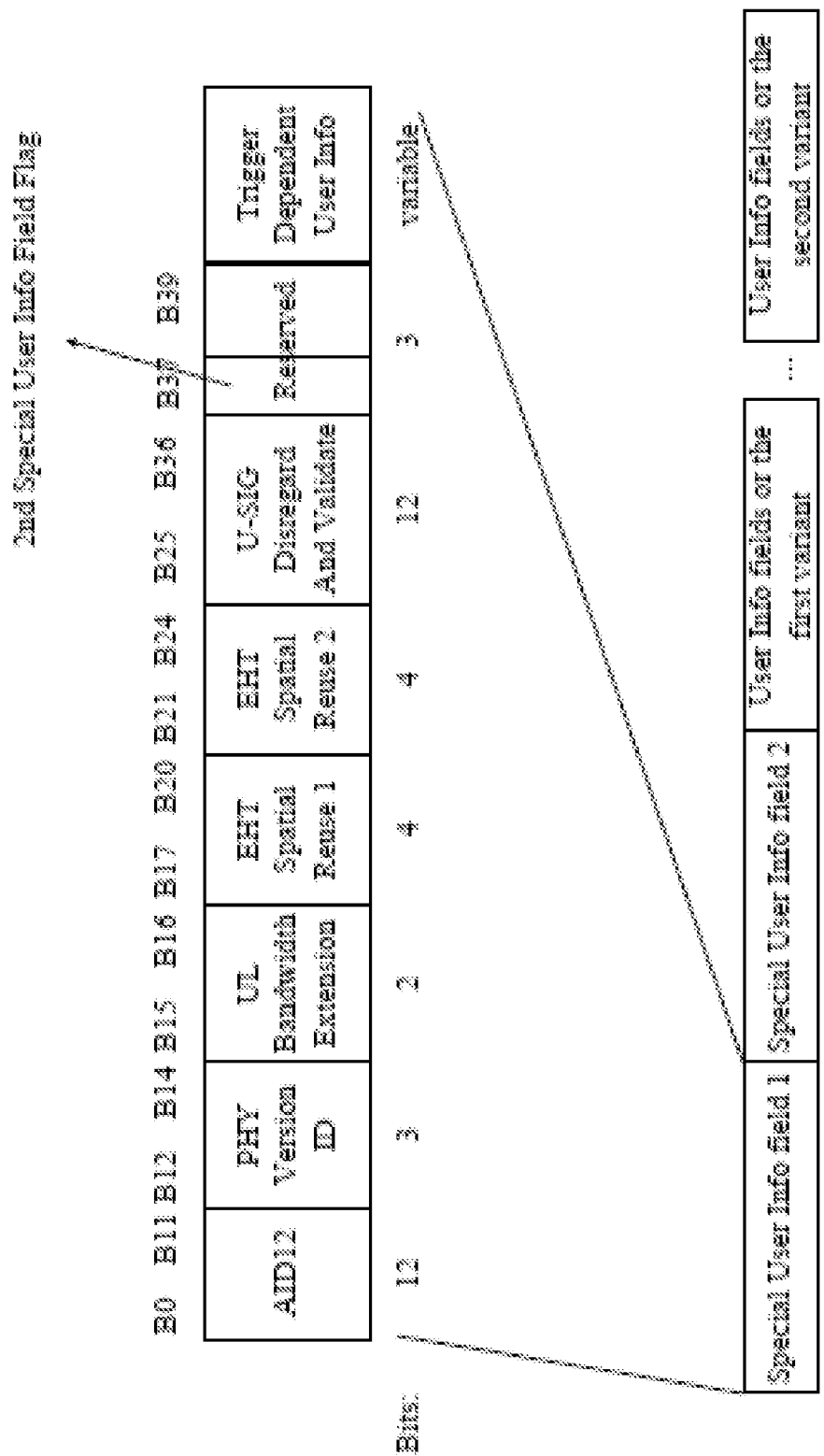
FIG. 14 illustrates an example of the first field included in the first Special User Info field according to an embodiment of the present disclosure.

FIG. 14 illustrates an example of the first field included in the first Special User Info field according to an embodiment of the present disclosure.

Referring to FIG. 14, the first field could be included in the first Special User Info field. For example, some of B37 to B39 of the first Special User Info field are assigned as the first field. The first field could indicate whether the second Special User Info field is present or not. Or the first field and B55 could jointly indicate whether the second Special User Info field is present. If the value of the first field in the first special User Info field is set to A, the second Special User Info field is present. Otherwise, the second Special User Info field is not present. A value of PHY Version ID field in different Special User Info field could be different. For example, the PHY Version ID field indicates EHT and EHT+in the first Special User Info field and the second Special User Info field, respectively. One Reserved field, for example B25 (as called a new variant start field) in User Info field could indicate whether the variant type is changed. For example, if the value in the new variant start field is A, then the following User Info field is the same variant type. Otherwise, the different variant type of User Info field is located for the STAs corresponding to the second Special User Info field.

Figure 15:
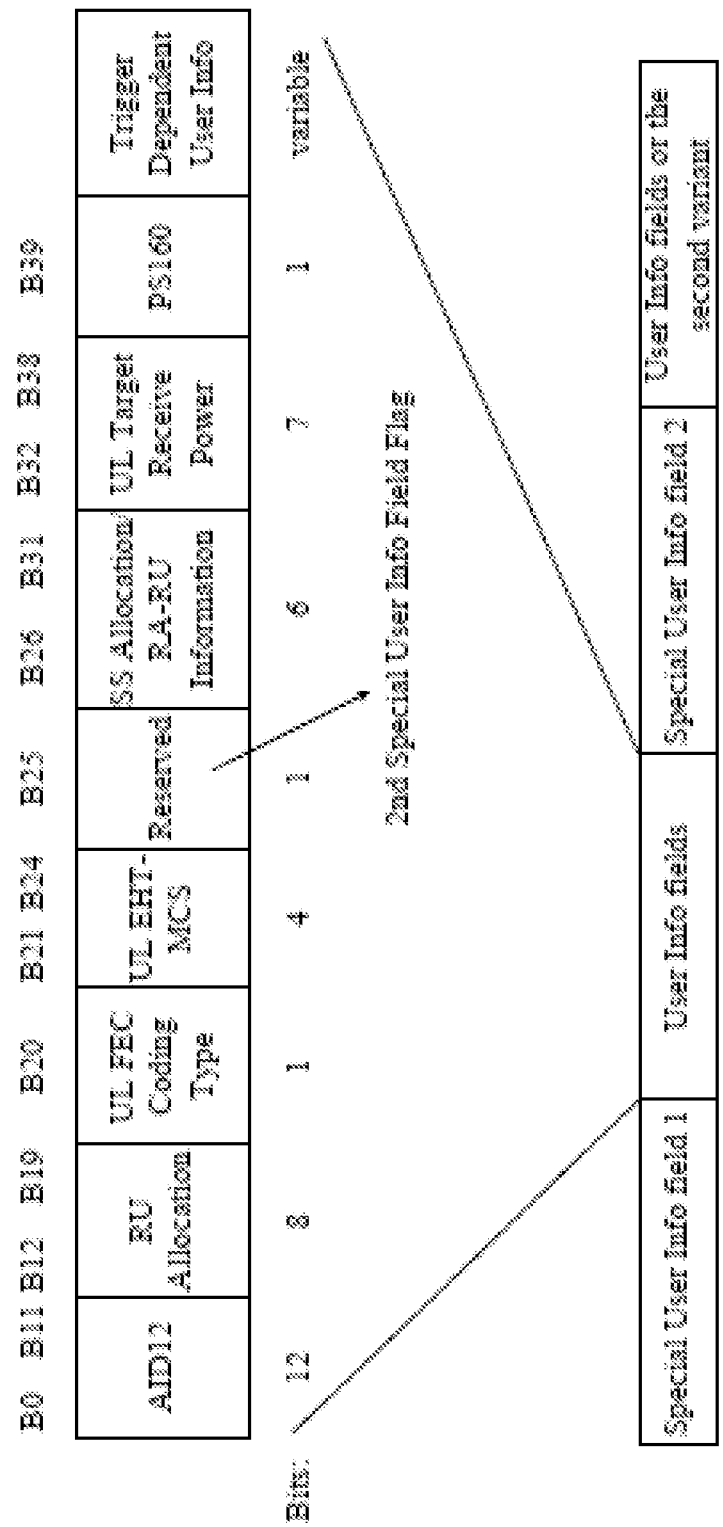
FIG. 15 illustrates an example of the first field included in the User Info field according to an embodiment of the present disclosure.

FIG. 15 illustrates an example of the first field included in the User Info field according to an embodiment of the present disclosure.

Referring to FIG. 15, the first field could be carried in a last User Info field wherein the User Info fields are related to the specific variant type corresponding to the first Special User Info field. One Reserved field, for example B25 (as called a new Special User Info field present) in the last User Info field could indicate whether the second Special User Info field is located just after the last User Info field. For example, if the value in the new Special User Info field present is A in the last User Info field, then the second Special User Info field is located just after the last User Info field. Otherwise, the second Special User Info field is not present. If the second Special User Info field is present, a value of PHY Version ID field in each Special User Info field could be different. For example, the PHY Version ID field indicates EHT and EHT+ in the first Special User Info field and the second Special User Info field, respectively. If the second Special User Info field is present, AID12 specially assigned for the second Special User Info field could be used to let STAs knows to see PHY Version ID. The value in AID12 is not assigned to AID for HE, EHT, EHT+STAs.

With the values from some fields in the Trigger frame, responding TB PPDU type could be determined depending on whether it is the first capable of AP or not. For example, Table 6 describes which type of User Info fields are carried in the Trigger frame wherein only one type of TB PPDUs is solicited. The first capable of AP does not set B54 and B55 to 1 and 0, respectively and if the bandwidth of a solicited TB PPDU is less than 320 MHz channel bandwidth, then B39 of the corresponding User Info field in the Trigger frame is set to 0 wherein SST operation is not defined for 320 MHz channel bandwidth.

TABLE 6

| | B55 | | Presence of | |
| B54 | Special User | B39 | Special | TB |
| HE/EHT | Info | | User Info | PPDU |
| P160 | Field Fag | PS160 | field | Type |
|---|---|---|---|---|
| Case 0 | 1 | 1 | 0 | No | HE |
| Case 1 | 1 | 0 | 0 | YES | HE |
| Case 2 | 1 | 0 | 1 | YES | EHT |
| Case 4 | 0 | 0 | 0 | YES | EHT |
| Case 4 | 0 | 0 | 1 | YES | EHT |

Referring to Table 6, in Case 0 the Trigger frame carries HE variant format and HE TB PPDUs are in response on the primary 160 MHz channel. In Case 1 to 4, 160 MHz and 320 MHz channel bandwidth should be considered to see the operation of A-PPDU for the second capable AP. When the Special User Info field is present, 320 MHz channel bandwidth could be indicated for EHT TB PPDUs with UL BW field and 2-bit UL Bandwidth Extension field as shown in Table 7 below. Given HE TB PPDUs and EHT TB PPDUs in response together for the second capable AP, UL BW field indicates the bandwidth of HE TB PPDU and both UL BW field and UL Bandwidth Extension field indicate the bandwidth of EHT TB PPDU.

TABLE 7

| UL BW | Bandwidth for HE TB PPDU (MHz) | UL Basdwidth Extension | Bandwidih for EHT TB PPDU (MHz) |
|---|---|---|---|
| 0 | 20 | 0 | 20 |
| 0 | 20 | 1 | Reserved |
| 0 | 20 | 2 | Reserved |
| 0 | 30 | 3 | Reserved |
| 1 | 40 | 0 | 40 |
| 1 | 40 | 1 | Reserved |
| 1 | 40 | 2 | Reserved |
| 1 | 40 | 3 | Reserved |
| 2 | 80 | 0 | 80 |
| 2 | 80 | 1 | Reserved |
| 2 | 80 | 2 | Reserved |
| 3 | 80 | 3 | Reserved |
| 3 | 160 | 0 | Reserved |
| 3 | 160 | 1 | 160 |
| 3 | 160 | 2 | 320-1 |
| 3 | 160 | 3 | 320-2 |

There are several examples to define how to set bandwidth information in Trigger frame and what to decode as the different variant TB PPDUs are received in Case 1 to Case 4. Depending on the channel bandwidth, some fields corresponding to the TB PPDU type (such as B54, B55, and B39) could provide either non A-PPDU transmission or A-PPDU transmission. For 320 MHz channel bandwidth operation, SST operation could be defined for entire channel bandwidth. Looking at the details of each case as below, In Case 1,
For 160 MHz channel bandwidth
  HE TB PPDU on the primary 160 MHz channel
    a value in UL BW field could be used.
For 320 MHz channel bandwidth (A-PPDU) wherein AP receives 320 MHz aggregated TB PPDU.
  HE TB PPDU on the primary 160 MHz channel
    a value in UL BW field could be used.
  EHT TB PPDU on the second 160 MHz channel
    Example 1) a value in UL BW field is used and UL BW extension field is set to 0 (or any value to indicate BW for EHT TB PPDU).
    Example 2) indicate 320 MHz channel as in Table 7
In case AP indicates each bandwidth in UL separately, it expects the entire bandwidth occupied by both HE TB PPDU and EHT TB PPDU.
  If non A-PPDU case, the trigger frame use UL BW field for HE TB PPDU and both UL BW field and UL BW extension field for EHT TB PPDU, respectively.
  If A-PPDU case, the trigger frame uses UL BW field for HE TB PPDU and UL BW extension field for EHT TB PPDU. Its channel bandwidth is calculated by EHT STAs to combine the channel bandwidth indicated in UL BW field and UL BW extension field.
  A-PPDU case could be indicated implicitly or explicitly. For example, B54, B55, and B39 (or similar field to indicate different User info fields) could be used to implicitly to indicate whether it is A-PPDU procedure. For example, one explicit control information (e.g. in common info field) could be included in Trigger frame (or EHT MU PPDU) to indicate whether it is A-PPDU procedure.
SST operation could allow EHT PPDU transmission including punctured 20 MHz subchannels.
In Case 2,
For 160 MHz channel bandwidth,
  EHT TB PPDU on the secondary 160 MHz channel based on SST operation supported
    Example 1) a value in UL BW field could be used.
    Example 2) indicate 160 MHz channel as in Table 7
For 320 MHz channel bandwidth (A-PPDU) wherein AP receives 320 MHz aggregated TB PPDU
  HE TB PPDU on the primary 160 MHz channel
    a value in UL BW field could be used.
  EHT TB PPDU on the secondary 160 MHz channel
    Example 1) a value in UL BW field is used and UL BW extension field is set to 0 (or any value to indicate BW for EHT TB PPDU).
    Example 2) indicate 320 MHz channel as in Table 7
In case AP indicates each bandwidth in UL separately, it expects the entire bandwidth occupied by both HE TB PPDU and EHT TB PPDU
  If non A-PPDU case, the trigger frame use UL BW field for HE TB PPDU and both UL BW field and UL BW extension field for EHT TB PPDU, respectively.
  If A-PPDU case, the trigger frame uses UL BW field for HE TB PPDU and UL BW extension field for EHT TB PPDU. Its channel bandwidth is calculated by EHT STAs to combine the channel bandwidth indicated in UL BW field and UL BW extension field.
  A-PPDU case could be indicated implicitly or explicitly. For example, B54, B55, and B39 (or similar field to indicate different User info fields) could be used to implicitly to indicate whether it is A-PPDU procedure. For example, one explicit control information (e.g. in common info field) could be included in Trigger frame (or EHT MU PPDU) to indicate whether it is A-PPDU procedure.

SST operation could allow EHT PPDU transmission including punctured 20 MHz subchannels.

In Case 3,

For 160 MHz channel bandwidth,
  EHT TB PPDU on the primary 160 MHz channel
    Example 1) UL BW field is used, and UL BW extension field is set to 0.
    Example 2) a value in UL BW field could be used (or any value to indicate BW for EHT TB PPDU)

For 320 MHz channel bandwidth wherein AP receives 320 MHz aggregated TB PPDU
  EHT TB PPDU on the primary 160 MHz channel
    Example 1) UL BW field is used, and UL BW extension field is set to 0.
    Example 2) a value in UL BW field could be used (or any value to indicate BW for EHT TB PPDU)
  EHT TB PPDU on 320 MHz channel
  In case AP indicates each bandwidth in UL separately, it expects the entire bandwidth occupied by both different TB PPDUs
  A-PPDU could consist of EHT and EHT+PPDU in this case.

SST operation could allow EHT PPDU transmission including punctured 20 MHz subchannels.

In Case 4,

For 160 MHz channel bandwidth,
  EHT TB PPDU on the secondary 160 MHz channel based on SST operation supported.
    UL BW field is used, and UL BW extension is set to 0.

For 320 MHz channel bandwidth
  EHT TB PPDU on 320 MHz channel
  In case AP indicates each bandwidth in UL separately, it expects the entire bandwidth occupied by both different TB PPDUs
  A-PPDU could consist of EHT and EHT+PPDU in this case SST operation could allow EHT PPDU transmission including punctured 20 MHz subchannels.

The resource could occupy the partial resource (RU or MRU) on the secondary 80 MHz channel and the partial resource (RU or MRU) on the secondary 160 MHz channel over 320 MHz channel.

For all cases above, this is only examples with 160 MHz HE TB PPDU and 160 MHz EHT TB PPDU. Without any further description, the same methods could be applied to different operating bandwidth of TB PPDUs and Trigger frame.

Even though EHT AP is aware of the entire UL bandwidth occupied by HE STAs and EHT STAs, HE STA and EHT STA do not recognize it depending on how to indicate the entire bandwidth as above. It might be the issues on some power leakage which may cause some performance loss. For non A-PPDU transmission, the bandwidth of the spectral mask applied to an EHT PPDU and an HE PPDU shall be determined by the bandwidth indicated in the Bandwidth subfield (e.g. U-SIG, Trigger frame, HE-SIG-A, respectively). For example, each value of the bandwidth information indicates 160 MHz channel even though the intention is to apply the spectral mask of 320 MHz channel. There might be some embodiments to be applied for A-PPDU. Embodiments below could be jointly supported. This is only examples with 160 MHz HE TB PPDU and 160 MHz EHT TB PPDU. Without any further description, the same methods could be applied to different operating bandwidth of TB PPDUs.

Embodiment 1) Given A-PPDU to be transmitted, with some methods (e.g. implicit or explicit signaling), EHT STAs are aware of the entire bandwidth even though its bandwidth indicates 160 MHz. Then the bandwidth of the spectral mask applied to the EHT PPDU shall be determined by the entire bandwidth and additional restrictions. Those restriction shall be defined for the signal leakage.

Embodiment 2) Given A-PPDU to be transmitted, HE STAs do not have any idea whether the secondary subchannels could be occupied for the different STAs. So, when EHT AP assign the resource to HE STAs, there might need some restriction. For example, few tones (at least 26 RU) close to the secondary channels are not assigned to HE STAs. For example, AP sets the UL power in the Trigger frame not to cause the performance loss. Restriction to MCS level could be applied. In this case, its capability could be indicated with capability elements (e.g. through beacon frame, other management frame, etc) As mentioned above, the RU Allocation subfield in the EHT variant User Info field in the Trigger frame along with the UL BW subfield in the Common Info field, the UL BW Extension subfield in the Special User Info field, and the PS160 subfield in the EHT variant User Info field, identifies the size and the location of the RU/MRU. B0 of the RU Allocation subfield is set to 0 to indicate primary 20 MHz channel, primary 40 MHz channel and primary 80 MHz channel. For primary 160 MHz channel, and 80+80 MHz channel, and 320 MHz channel, B0 of the RU Allocation subfield is set to 1. The HE STA may ignore B0 for primary 160 MHz channel and 80+80 MHz channel (HE only). The EHT STA may check B0 for primary 160 MHz channel and 320 MHz channel if the EHT STA is addressed by the EHT variant User Info field. In the EHT variant User Info field, the PS160 subfield is set to 1 to indicate 320 MHz channel and set to 0 to include primary 20 MHz channel, primary 40 MHz channel, primary 80 MHz channel, and primary 160 MHz channel Focusing on the value of PS160 subfield in the EHT variant User Info field, with PS160 subfield set to 0 in the 20/40/80/160 MHz EHT PPDU, there is no way to assign EHT STAs on the secondary 160 MHz channel because PS160 subfield indicates which 160 MHz channel is assigned in the Table 5 above.

Figure 16:
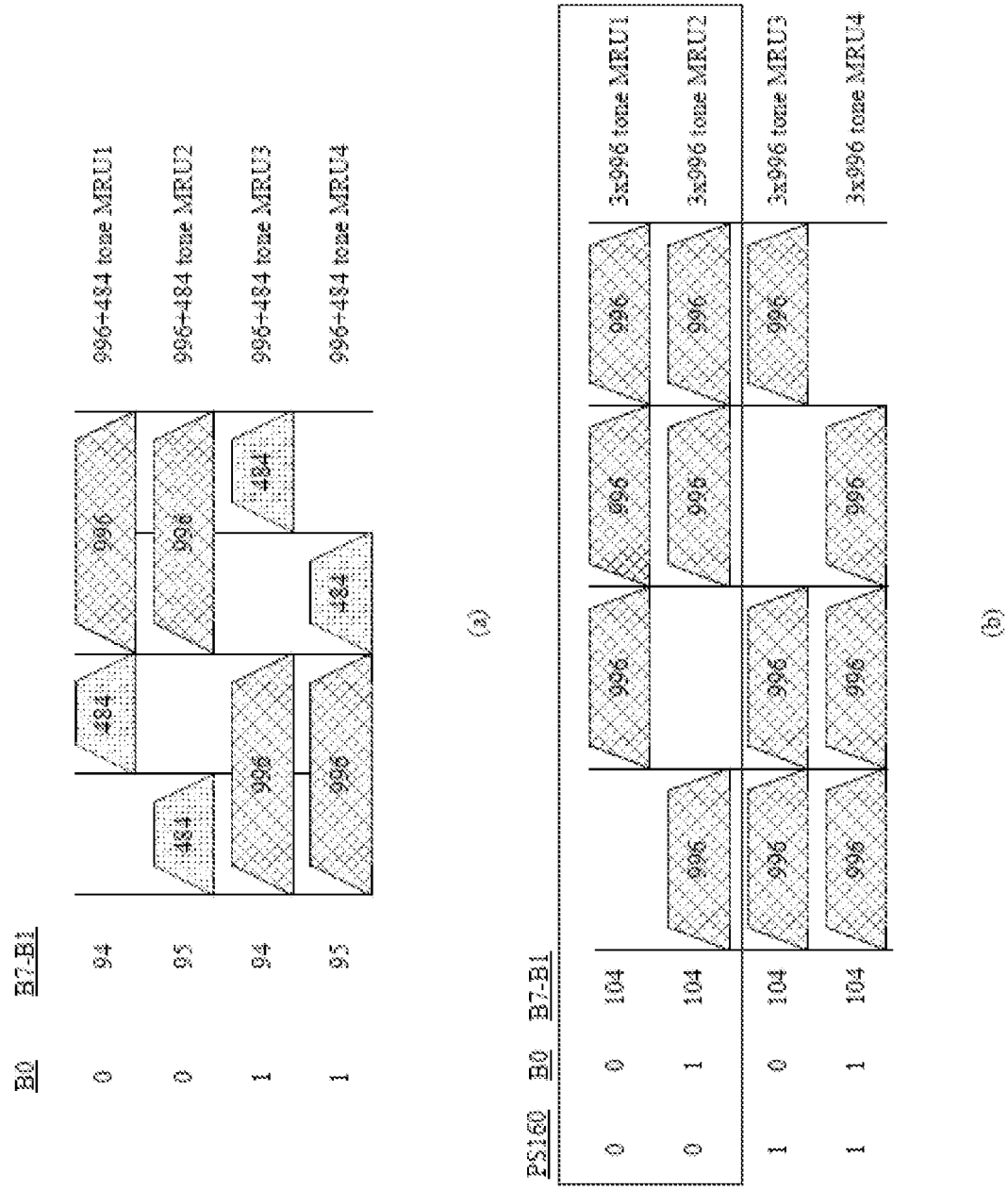
FIG. 16 illustrates an example of location and size of the RU/MRU with PS160 subfield set to 0 according to an embodiment of the present disclosure.

FIG. 16 illustrates an example of location and size of the RU/MRU with PS160 subfield set to 0 according to an embodiment of the present disclosure. A (a) of FIG. 16 is an example of size of the RU/MRU set to 996+484 tones with PS160 subfield set to 0 in Table 5 and a (b) of FIG. 16 is an example of size of the RU/MRU set to 3,996 tones with PS160 subfield set to 0 in Table 5.

Referring to FIG. 16, the location of 160 MHz EHT TB PPDU is assigned based on PS160 subfield and B0-B7 of RU Allocation field wherein PS160 subfield set to 0 indicates it is located on the primary 160 MHz channel. When EHT TB PPDU is assigned over 320 MHz channel bandwidth, the location of EHT TB PPDU with PS160 subfield set to 0 is limited as below regardless of whether bandwidth is 160 MHz or 320 MHz.

To define the location of EHT TB PPDU correctly when assigned over 320 MHz channel bandwidth, there might several examples as follows. For case of (a) of FIG. 16, Example 1) 320 MHz channel bandwidth is not supported in this case which means A-PPDU in UL is not allowed.
Case 2 in Table 6 covers HE PPDU on the primary 160 MHz channel and EHT PPDU on the secondary 160 MHz channel to support the aggregated TB PPDU for 320 MHz channel bandwidth.
If RU or MRU are not assigned on the secondary 160 MHz channel, it would be a waste of resource only by no indication method so far.
Example 2) B39, PS160 subfield, could be decoupled from the Table 5 to support A-PPDU. Given B54, HE/EHT P160 subfield (=1) and B55, Special User Info Field Flag subfield, (=0), HE STAs could be assigned on the primary 160 MHz channel. For the secondary 160 MHz channel, PS160 subfield and RU Allocation field are used to indicate the location of RU or MRU on the secondary 160 MHz channel for EHT STAs.
Example 3) B39 could be decoupled from the Table 5 to support A-PPDU. Given B54(=1) and B55(=0), HE STAs could be assigned on the primary 160 MHz channel. For the secondary 160 MHz channel, PS160 subfield is ignored to assume that RU Allocation field indicates the location of RU or MRU on the secondary 160 MHz channel for EHT STAs.
Example 4) one (or some) of Reserved bits, for example B37 to B39, in the Special User Info field could indicate the location of RU or MRU instead of PS160 subfield.
A-PPDU case could be indicated implicitly or explicitly. For example, B54, B55, and B39 (or similar field to indicate different User info fields) could be used to implicitly to indicate whether it is A-PPDU procedure. For example, one explicit control information (e.g. in Common Info field) could be included in Trigger frame (or EHT MU PPDU) to indicate whether it is A-PPDU procedure
For case of (b) of FIG. 16,
Example 1) 320 MHz channel bandwidth is not supported.
If RU or MRU are not assigned on the secondary 160 MHz channel, it would be a waste of resource only by no indication method so far.
Example 2) B39 could be decoupled from the Table 5 when B54 and B55 set to 0 and 0, respectively. It should be the same operation as EHT STAs assigned on the 320 MHz channel bandwidth.
Example 3) B39 could be decoupled from the Table 5. Given B54(=0) and B55(=0), EHT STAs could be assigned on the primary 160 MHz channel. For the secondary 160 MHz channel, B39 is ignored to assume that RU Allocation field is used to indicate the location of RU or MRU on the secondary 160 MHz channel for EHT STAs. EHT STAs on the secondary 160 MHz channel could be the different type of EHT STA on the primary 160 MHz channel wherein EHT STAs on the secondary 160 MHz channel support different puncturing patterns. For the secondary 80 MHz channel and the secondary 160 MHz channel, B39 and RU Allocation field is used to indicate the location of RU or MRU on over 320 MHz channel for EHT STAs. Those EHT STAs could be the different type of EHT STA on the primary 160 MHz channel wherein those EHT STAs support different puncturing patterns.
Example 4) B39 could be decoupled from the Table 5. Given B54(=0) and B55(=0), EHT STAs could be assigned on the primary 160 MHz channel. For the secondary 160 MHz channel, B39 and RU Allocation field are used to indicate the location of RU or MRU on the secondary 160 MHz channel for EHT STAs.
Example 5) B39 could be decoupled from the Table 5. Given B54(=0) and B55(=0), EHT STAs could be assigned on 320 MHz channel.
Example 6) one (or some) of Reserved bits, for example B37 to B39, in Special User Info field could indicate the location of RU or MRU instead of PS160 subfield.
A-PPDU case could be indicated implicitly or explicitly. For example, B54, B55, and B39 (or similar field to indicate different User info fields) could be used to implicitly to indicate whether it is A-PPDU procedure. For example, one explicit control information (e.g. in Common Info field) could be included in Trigger frame (or EHT MU PPDU) to indicate whether it is A-PPDU procedure Considering A-PPDU for the second capable AP, given 320 MHz channel bandwidth the basic assumption should be that SST operation setup is completed. EHT STAs (or EHT+STAs) are aware of the location within the secondary 80 MHz channel, or secondary 160 MHz channel and if any subchannel is punctured, at least one non-punctured 20 MHz subchannel is supposed to be known. In this case, the primary 80 MHz channel (or the primary 160 MHz channel) is likely to be occupied by HE STAs.

Figure 17:
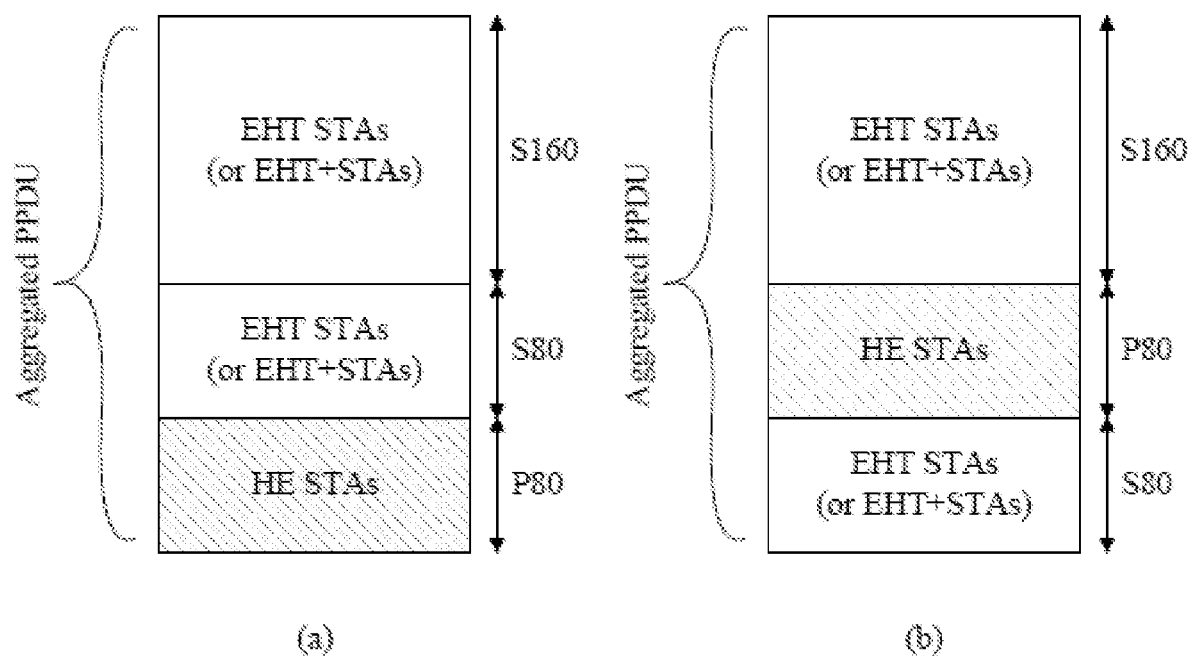
FIG. 17 illustrates an example of location of EHT STAs in 320 MHz channel bandwidth for A-PPDU according to an embodiment of the present disclosure.

FIG. 17 illustrates an example of location of EHT STAs in 320 MHz channel bandwidth for A-PPDU according to an embodiment of the present disclosure. A (a) of FIG. 17 is an example of HE STAs assigned on the lower primary 80 MHz channel, and a (b) of FIG. 17 is an example of HE STAs assigned on the upper primary 80 MHz channel.

Referring to FIG. 17, with EHT STAs assigned on the secondary 80 MHz channel, or the secondary 160 MHz channel, non-OFDMA transmission could be used. Moreover, EHT STAs could be assigned to MRU consisting of the partial resource on secondary 160 MHz channel (including 20 MHz channel not to be punctured like the primary 20 MHz channel on the primary 160 MHz channel) and the partial resource on the primary 160 MHz channel. The EHT MU PPDU for non-OFDMA transmission could be used for single user transmission and full bandwidth (with/without puncturing) for multiple user transmission. The combination of UL/DL field and PPDU Type And Compression Mode field to indicate non-OFDMA transmission is shown in Table 8 below.

In case 160 MHz channel bandwidth indicated in U-SIG of 20/40/80/160 MHz MU PPDU for A-PPDU transmission, it is transparent like MU PPDU of non-A-PPDU transmission. In case 320 MHz channel bandwidth indicated in U-SIG of MU PPDU for A-PPDU transmission, there are several embodiments to be considered because additional puncturing patterns might be defined. Any of embodiment below could be jointly used to support this.

Embodiment 1) introduce one signal field to indicate whether it is A-PPDU. It could make it clear on top of setup for SST operation in the management or control frame level with explicit signaling in the PHY preamble.

Embodiment 2) with AP and STA in capable devices for A-PPDU, allow to use additional puncturing pattern such as xxxx 1111, xx11 1111, 11xx 1111, 1111 xxxx, 1111 xx11, 1111 11xx. Note that a "1" denotes a non-punctured subchannel and an "x" denotes a punctured subchannel. The puncturing granularity for 80 MHz and 160 MHz PPDU bandwidth is 20 MHz, and the puncturing granularity for 320 MHz PPDU bandwidth is 40 MHz.

TABLE 8

| U-SIG fields | | | | Description | |
|---|---|---|---|---|---|
| UL/DL | PPDU Type And Compression Mode | EHT PPDU format | EHT-SIG present? | RU Allocation subfields present? | Total nUmber of User fields in MU PPDU or transmitters in TB PPDU | Note |
| 0 (DL) | 0 | EHT MU | Yes | Yes | ≥1 | DL OFDMA (including non-MU-MIMO and MU-MIMO) |
| | 1 | EHT MU | Yes | No | 1 for transmission is a single user; 0 for NDP | Transmission to a single user or NDP (Not to AP. Typically "DL") |
| | 2 | EHT MU | Yes | No | >1 | DL MU-MIMO (non-OFDMA) |
| | 3 | — | — | — | — | Validate if dot11EHTBaseLine-FeaturesImplementedOnly equals true |
| 1 (UL) | 0 | EHT TB | No | — | ≥1 | UL OFDMA (including non-MU-MIMO and MU-MIMO) |
| | 1 | EHT MU | Yes | No | 1 for transmission to a single user; 0 for NDP | Transmission to a single user or NDP (To AP, i.e., "UL") |
| | 2-3 | — | — | — | — | Validate if dot11EHTBaseLine-FeaturesImplementedOnly equals true |

With EHT STAs assigned on the secondary 160 MHz channel, OFDMA transmission could be used. Moreover, EHT STAs could be assigned to MRU consisting of partial resource on secondary 160 MHz channel (including 20 MHz channel not to be punctured like the primary 20 MHz channel on the primary 160 MHz channel) and partial resource on the primary 160 MHz channel. For example, EHT MU PPDU for OFDMA transmission could be used for multiple user transmission assigned for RUs and MRUs. The combination of UL/DL and PPDU Type And Compression Mode field to indicate OFDMA transmission is shown in Table 8.

In case 160 MHz channel bandwidth indicated in U-SIG of 20/40/80/160 MHz MU PPDU for A-PPDU transmission, it is transparent like MU PPDU of non-A-PPDU transmission. In case 320 MHz channel bandwidth indicated in U-SIG of MU PPDU for A-PPDU transmission, since there is no way to indicate whether primary 160 MHz channel is punctured in U-SIG, this case might not get along if keeping puncturing pattern being limited to each 80 MHz subchannel. Moreover, current puncturing pattern of 1111, 0111, 1011, 1101, 1110, 0011, 1100, and 1001 does not support this 80 MHz subchannel is punctured out.

In terms of A-PPDU operation, there is a need to consider how to signal the puncturing information indicating which 20 MHz subchannel is not punctured for the operation on non-primary 80 MHz channel (or non-primary 160 MHz channel) for OFDMA and non-OFDMA transmission.

For non-OFDMA transmission case, at least one 20 MHz subchannel should be known within on the secondary subchannels. For example, one 20 MHz subchannel should be known within the secondary 160 MHz channel.

For OFDMA transmission case, at least one 20 MHz subchannel should be known within each 80 MHz subchannel on the secondary subchannels. For example, each 20 MHz subchannel for two 80 MHz subchannels should be known on the secondary 160 MHz channel.

The puncturing information could be in the different ways as below.

The parameter INACTIVE_SUBCHANNELS to indicate which 20 MHz subchannels are punctured.
defined to be set by MAC through TXVECTOR parameters Operation element wherein this element could be carried in Beacon frame. Once it is received, this puncturing pattern could be used unless additional indication (e.g. the dynamic puncturing channel indication or another static puncturing channel indication) is not correctly received.

Puncturing information could be static or dynamic.
Recently received puncturing information should be used.

The similar concept in FIG. 17 could be applied to A-PPDU on the 160 MHz channel with EHT STAs (or EHT+STAs) assigned on the secondary 80 MHz channel, or with EHT STAs (or EHT+STAs) assigned on the secondary 40 MHz channel and on the secondary 80 MHz channel.

Figure 18:
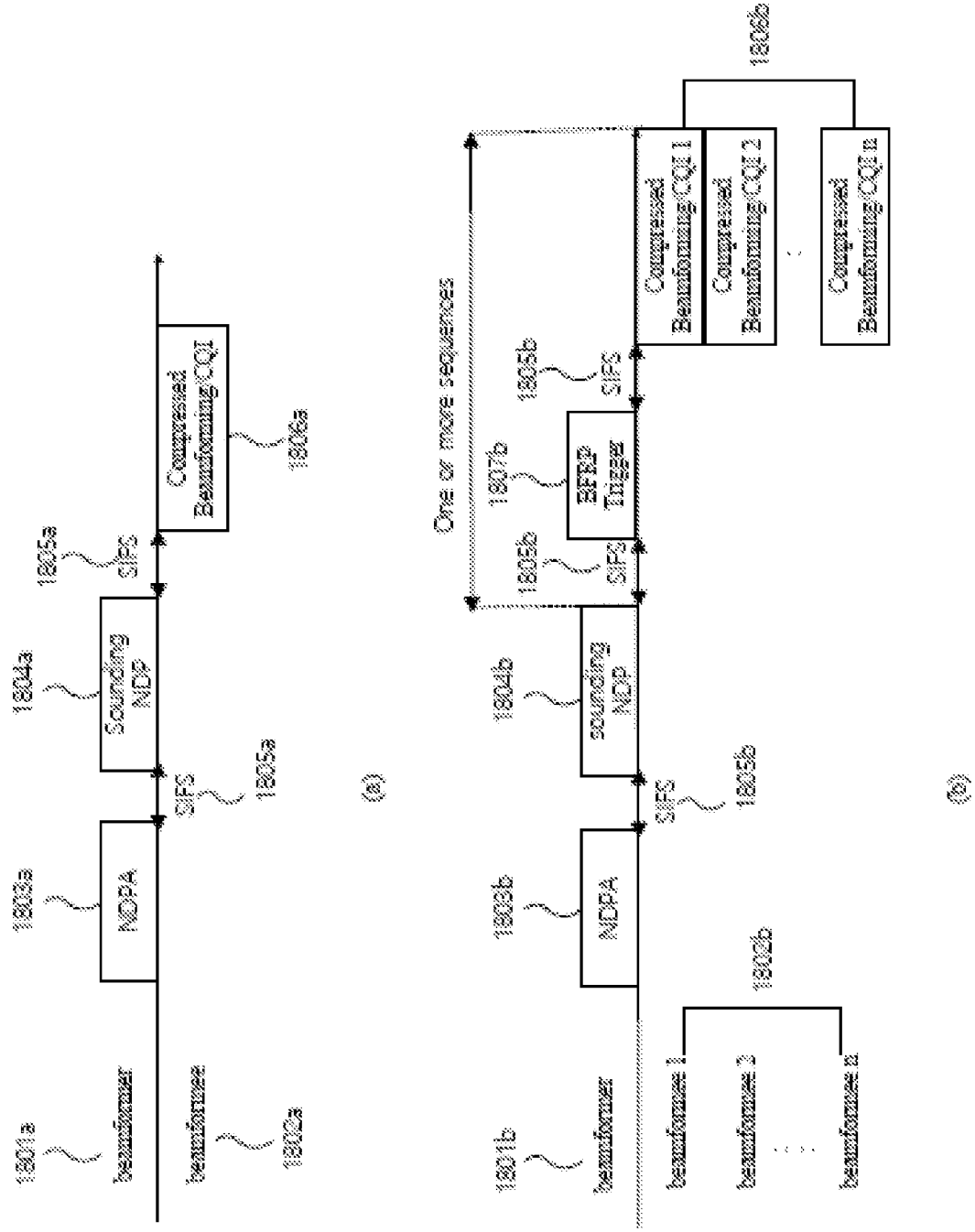
FIG. 18 illustrates a sounding protocol sequence according to an embodiment of the present disclosure.

There is a sounding protocol sequence as defined with the frame exchange sequences for non-TB sounding sequence (for single user transmission) and TB sounding sequence (for multiple user transmission) as shown in FIG. 18 below.

FIG. 18 illustrates a sounding protocol sequence according to an embodiment of the present disclosure. A (a) of FIG. 18 is an example of a non-TB sounding sequence and a (b) of FIG. 18 is an example of a TB sounding sequence.

Referring to (a) of FIG. 18, the beamformed transmission is initiated with a NDP Announcement frame 1803a by the beamformer 1801a. After SIFS 1805a interval, the NDP frame 1804a is transmitted to be estimated for channel matrix by for the beamformee 1802a and beamformee 1802a calculates the beam matrix. After SIFS 1805a interval, Compressed Beamforming/channel quality indicator (CQI) frame 1806a including feedback information is sent by the beamformee 1802a. NDP Announcement frame 1803a contains proper signaling to help this procedure for the STA wherein the STA ID is included in NDP Announcement frame 1803a.

Referring to (b) of FIG. 18, the beamformed transmission is initiated with a NDP Announcement frame 1803b by the beamformer 1801b. After SIFS 1805b interval, the NDP frame 1804b is transmitted to be estimated for channel matrix by for the beamformees 1802b (beamformee 1, beamformee 2, . . . beamformee n) and beamformees 1802b calculate the beam matrix. After SIFS 1805b, the beamforming report poll (BFRP) Trigger frames 1807b followed by Compressed Beamforming/CQI frames 1806b (Compressed Beamforming/CQI frame 1, Compressed Beamforming/CQI frame 2, . . . Compressed Beamforming/CQI frame n) from a plurality of beamformees 1802b are exchanged one or more times. NDP Announcement frame 1803b contains proper signaling to help this procedure for some STAs wherein the STA ID is included in NDP Announcement frame 1803b.

Figure 19:
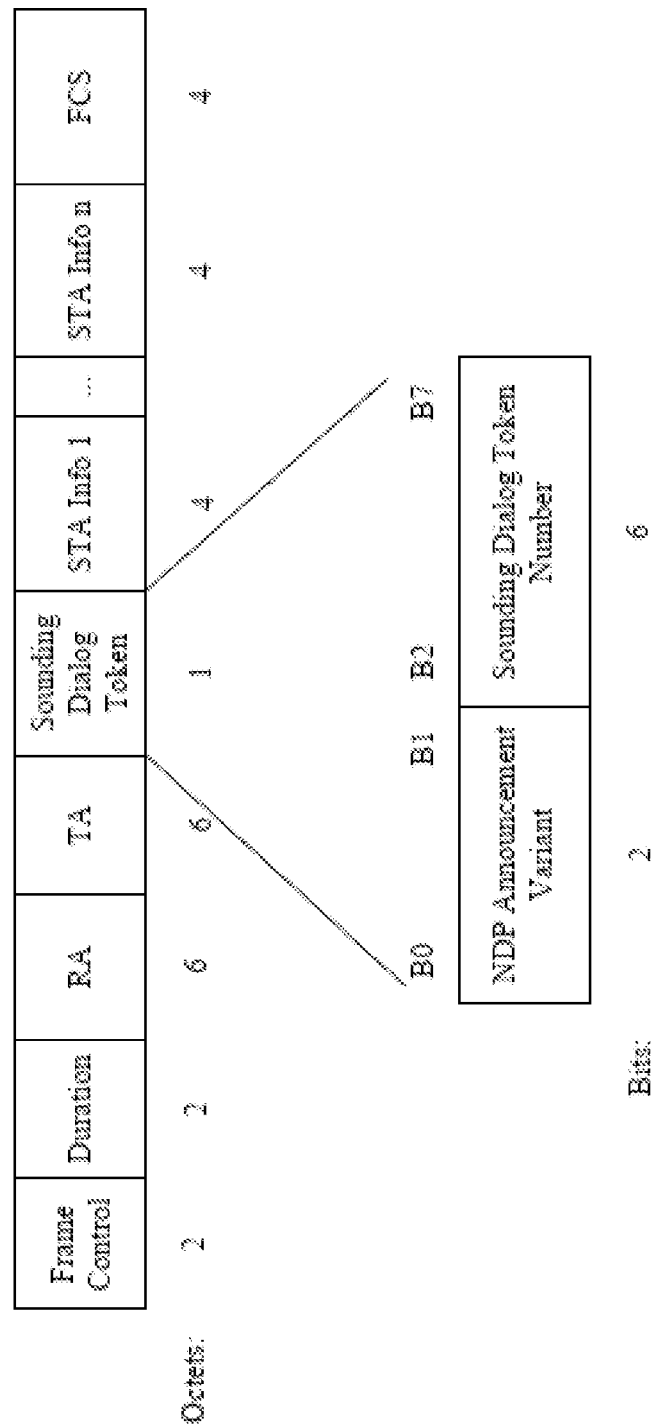
FIG. 19 illustrates an example of the Sounding Dialog Token field in the NDP Announcement frame according to an embodiment of the present disclosure.

The NDP Announcement frame has four variants, which includes the VHT NDP Announcement frame, the HE NDP Announcement frame, the Ranging NDP Announcement frame, and the EHT NDP Announcement frame depending on the NDP Announcement Variant subfield in the Sounding Dialog Token field in FIG. 19.

FIG. 19 illustrates an example of the Sounding Dialog Token field in the NDP Announcement frame according to an embodiment of the present disclosure.

Referring to FIG. 19, the Sounding Dialog Token field in the NDP Announcement frame includes the NDP Announcement Variant subfield and the Sounding Dialog Token Number field. The setting of the NDP Announcement Variant subfield in the Sounding Dialog Token field identifies the variant of the NDP Announcement frame as shown in Table 9. For example, B1 and B0 of the NDP Announcement Variant subfield in the Sounding Dialog Token field are set to 0 to identify the frame as a VHT NDP Announcement frame; B1 and B0 of the NDP Announcement Variant subfield in the Sounding Dialog Token field are set to 1 and 0 respectively to identify the frame as an HE NDP Announcement frame; B1 and B0 of the NDP Announcement Variant subfield in the Sounding Dialog Token field are set to 0 and 1 respectively to identify the frame as an Ranging NDP Announcement frame; and B1 and B0 of the NDP Announcement Variant subfield in the Sounding Dialog Token field are set to 1 to identify the frame as a an EHT NDP Announcement frame. The Sounding Dialog Token Number field in the Sounding Dialog Token field includes a value selected by the beamformer (e.g. AP) to identify the corresponding NDP Announcement frame. For example, in case that a value of the NDP Announcement Variant subfield in the Sounding Dialog Token field is set to 3 (EHT NDP Announcement frame), the Sounding Dialog Token Number field in the Sounding Dialog Token field includes a value selected by the beamformer (e.g. AP) to identify the EHT NDP Announcement frame.

TABLE 9

NDP Announcement Variant subfield

| B1 | B0 | NDP Announcement frame variant |
|---|---|---|
| 0 | 0 | VHT NDP Announcement frame |
| 0 | 1 | Ranging NDP Announcement frame |
| 1 | 0 | HE NDP Announcement frame |
| 1 | 1 | EHT NDP Announcement frame |

In legacy 11be, the EHT NDP Announcement frame includes at most one STA Info field per STA. The EHT NDP Announcement frame does not include a STA Info field with the AID11 subfield larger than 2047. The AID11 subfield encoding in NDP Announcement frame in legacy 11be is defined in Table 10.

TABLE 10

| AID subfield | Description | NDP Amonneement frame variant applicability |
|---|---|---|
| 0 | STA Info field is addressed to the associated AP | Applicable to any variant |
| 1-2007 | STA Info field is addressed to an associated STA whose AID is equal to the value in the AID11 subfield if the NDP Announcement frame is not a Ranging variant STA Info field is addressed to an unassociated STA or an associated STA whose RSID/AID is equal to the value in the RSID11/AID11 subfield if the NDP Announcement frame is a Ranging variant. | Applicable to any variant |
| 2008-2042 | Reserved | Not applicable to any variant |
| 2043 | STA Info field contains a sequence authentication code if the NDP Announcement frame is a Ranging variant. This AID11 value is reserved otherwise | Applicable to any variant |
| 2044 | STA Info field contains a partial TSF if the NDP Announcement frame is a Ranging variant. The AID11 value is reserved otherwise. | Applicable to any variant |
| 2045 | STA Info field contains ranging measurement parameters if the NDP Announcement frame is a Ranging variant. This AID11 value is reserved otherwise. | Applicable to any variant |

TABLE 10-continued

| AID subfield | Description | NDP Announcement frame variant applicability |
|---|---|---|
| 2046 | Reserved | Not applicable to any variant |
| 2047 | STA Info field contains a disallowed subchannel bitmap if the NDP Announcement frame is an HE variant. This AID11 value is reserved otherwise. | Applicable to any variant |

However, regardless of definition above, when the EHT AP transmits the EHT NDP Announcement frame and the EHT NDP frame followed by the Trigger frame to solicit Beamforming/CQI feedback information from STAs wherein the STAs are signaled in the AID12 subfield in EHT variant User Info field, since the Special User Info field is identified by the AID12 value of 2007 and is optionally present in the Trigger frame that is generated by the EHT AP, the EHT AP does not use the value 2007 as an AID for any STA associated to it.

With the same value (=2007) of AID subfield used for different purpose, this causes the discrepancy between STA Info field in the EHT NDP Announcement frame and the EHT variant User Info field in the Trigger frame in legacy 11be. Therefore, there is a need to update Table 10 as Table 11 below. It means value 1 to 2006 could be assigned for EHT STAs as AID12 subfield in EHT variant User Info field and value 2007 should be reserved for VHT and HE variant User Info field.

TABLE 11

| AID subfield | Description | NDP Announcement frame variant applicability |
|---|---|---|
| 0 | STA info field is addressed to the associated AP | Applicable to any variant |
| 1-2007 | STA Info field is addressed to an associated STA whose AID is equal to the value in too AID11 subfield if the NDP Announcement frame is not a Ranging variant. STA Info field is addressed to an unassociated STA or an associated STA whose RSID/AID is equal to the value in toe RSID11/AID11 subfield if the NDP Announcement frame is a Ranging variant. | Applicable to any variant except EHT variant assigned for any STAs associated to the EHTAP Note: If the AID12 subfield is 2007 and the Trigger frame containing this User into field is generated by an EHT AP It is a Special User into field |
| 2008-2042 | Reserved | Not applicable to any variant |
| 2043 | STA Info field contains a sequence authentication code if the NDP Announcement frame is a Ranging variant. This AID11 value is reserved otherwise. | Applicable to any variant |
| 2044 | STA Info field contains a partial TSF if the NDP Announcement frame is a Ranging variant. The AID11 value is reserved otherwise. | Applicable to any variant |
| 2045 | STA Into field contains ranging measurement parameters if the NDP Announcement frame is a Ranging variant. This AID11 value is reserved otherwise. | Applicable to any variant |
| 2046 | Reserved | Not applicable to any variant |
| 2047 | STA Info field contains a disallowed subchannel bitmap if the NDP Announcement frame is an HE variant This AID11 value is reserved otherwise. | Applicable to any variant |

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a transmitter in a wireless local area network (WLAN), the method comprising:
   determining to operate in A (aggregated)-PPDU transmission, wherein the A-PPDU transmission includes transmission of multiple sub-PPDUs with different variant formats; and
   transmitting, to a receiver, a trigger frame including a common information field, a first field, and a second field,
   wherein the first field indicates whether a first special user information field which does not carry user specific information and carries first additional common information not provided in the common information field for a first variant format is present; and
   wherein the second field indicates whether a second special user information field which does not carry user specific information and carries second additional common information not provided in the common information field for a second variant format is present, and
   wherein the first special user information field is located before the second special user information field in the trigger frame, wherein the trigger frame includes the first special user information field and the second special user information field and solicits a PPUD with the first variant format and a PPDU with the second variant format together, when the first field indicates that the first special user information field is present and the second field indicates that the second special user information field is present.

2. The method of claim 1, wherein the second field is included in a common information field including common information in the trigger frame.

3. The method of claim 1, wherein the second field is included in the first special user information field in the trigger frame.

4. The method of claim 1, wherein the second field is included in at least one first user information field including user information for the first variant format in the trigger frame.

5. The method of claim 2, wherein the first special user information field is followed by at least one first user information field including user information for the first variant format and the second special user information field is followed by at least one second user information field including user information for the second variant format.

6. The method of claim 3, wherein at least one reserved bit in the first special user information field is assigned as the second field.

7. The method of claim 4, wherein the second field is included in a last user information field among the at least one first user information field in the trigger frame.

8. The method of claim 1, wherein the first field and second field jointly indicate whether the second special user information field is present.

9. A transmitter in a wireless local area network (WLAN), the transmitter comprising:
 a transceiver; and
 a processor configured to:
  determine to operate in A (aggregated)-PPDU transmission, wherein the A-PPDU transmission includes transmission of multiple sub-PPDUs with different variant formats; and
  control the transceiver to transmit, to a receiver, a trigger frame including a common information field, a first field, and a second field,
 wherein the first field indicates whether a first special user information field which does not carry user specific information and carries first additional common information not provided in the common information field for a first variant format is present; and
 wherein the second field indicates whether a second special user information field which does not carry user specific information and carries second additional common information not provided in the common information field for a second variant format is present, and
 wherein the first special user information field is located before the second special user information field in the trigger frame,
 wherein the trigger frame includes the first special user information field and the second special user information field and solicits a PPUD with the first variant format and a PPDU with the second variant format together, when the first field indicates that the first special user information field is present and the second field indicates that the second special user information field is present.

10. The transmitter of claim 9, wherein the second field is included in a common information field including common information in the trigger frame.

11. The transmitter of claim 9, wherein the second field is included in the first special user information field in the trigger frame.

12. The transmitter of claim 9, wherein the second field is included in at least one first user information field including user information for the first variant format in the trigger frame.

13. The transmitter of claim 10, wherein the first special user information field is followed by at least one first user information field including user information for the first variant format and the second special user information field is followed by at least one second user information field including user information for the second variant format.

14. The transmitter of claim 11, wherein at least one reserved bit in the first special user information field is assigned as the second field.

15. The transmitter of claim 12, wherein the second field is included in a last user information field among the at least one first user information field in the trigger frame.

16. The transmitter of claim 9, wherein the first field and second field jointly indicate whether the second special user information field is present.

* * * * *